(12) United States Patent
Bawendi et al.

(10) Patent No.: US 12,441,939 B2
(45) Date of Patent: Oct. 14, 2025

(54) LIGHT EMITTING NANOCRYSTALS AND METHODS OF MAKING LIGHT EMITTING NANOCRYSTALS

(71) Applicant: MASSACHUSETTS INSTITUTE OF TECHNOLOGY, Cambridge, MA (US)

(72) Inventors: Moungi Bawendi, Cambridge, MA (US); Eric Hansen, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/086,285

(22) Filed: Oct. 30, 2020

(65) Prior Publication Data

US 2021/0207024 A1 Jul. 8, 2021

Related U.S. Application Data

(60) Provisional application No. 62/929,086, filed on Oct. 31, 2019.

(51) Int. Cl.

| | | |
|---|---|---|
| *C09K 11/64* | (2006.01) | |
| *B82Y 20/00* | (2011.01) | |
| *B82Y 40/00* | (2011.01) | |
| *C09K 11/60* | (2006.01) | |
| *C09K 11/88* | (2006.01) | |

(52) U.S. Cl.
CPC .......... *C09K 11/642* (2013.01); *C09K 11/605* (2013.01); *C09K 11/881* (2013.01); *B82Y 20/00* (2013.01); *B82Y 40/00* (2013.01)

(58) Field of Classification Search
CPC ... C09K 11/642; C09K 11/881; C09K 11/605; B82Y 20/00; B82Y 40/00
See application file for complete search history.

(56) References Cited

U.S. PATENT DOCUMENTS

| | | | |
|---|---|---|---|
| 6,225,198 B1 | 5/2001 | Allvisatos et al. | |
| 6,306,736 B1 | 10/2001 | Allvisatos et al. | |
| 6,322,901 B1 | 11/2001 | Bawendi et al. | |
| 6,576,291 B2 | 6/2003 | Bawendi et al. | |
| 6,855,202 B2 | 2/2005 | Allvisatos et al. | |
| 8,945,503 B2 * | 2/2015 | Ai ........................ | H01F 1/0009 423/511 |
| 9,748,422 B2 * | 8/2017 | Allen .................. | C09K 11/584 |
| 9,834,724 B2 | 12/2017 | Kim et al. | |

(Continued)

FOREIGN PATENT DOCUMENTS

| | | | |
|---|---|---|---|
| BY | 18174 | * | 4/2014 |
| CN | 102557002 A | | 7/2012 |

(Continued)

OTHER PUBLICATIONS

Wang et al, "Facile Synthesis of Cu—In—S/ZnS Core/Shell Quntum Dots in 1-Dodecanethiol for Efficent Light-Emitting Diodes With an External Quantum Efficency of 7.8%", Chem. Mater., 2018, 30, pp. 8839-8947, Dec. 5, 2018.*

(Continued)

*Primary Examiner* — C Melissa Koslow
(74) *Attorney, Agent, or Firm* — Wolf, Greenfield & Sacks, P.C.

(57) ABSTRACT

A composition can include a copper containing nanocrystal.

16 Claims, 21 Drawing Sheets

(56) References Cited

U.S. PATENT DOCUMENTS

| | | |
|---|---|---|
| 2006/0157686 A1 | 7/2006 | Jung et al. |
| 2010/0141172 A1 | 6/2010 | Uchida et al. |
| 2012/0061627 A1 | 3/2012 | Reiss et al. |
| 2013/0052353 A1 | 2/2013 | Ai et al. |
| 2013/0220405 A1 | 8/2013 | Mahler et al. |
| 2018/0040749 A1 | 2/2018 | Allen et al. |
| 2018/0151817 A1 | 5/2018 | Cho et al. |

FOREIGN PATENT DOCUMENTS

| | | |
|---|---|---|
| CN | 104512860 A | 4/2015 |
| CN | 105154060 * | 12/2015 |
| CN | 107418564 * | 12/2017 |
| JP | 2017084987 A | 5/2017 |
| WO | WO 2018/198137 * | 11/2018 |

OTHER PUBLICATIONS

Bhattacharyya et al., "Effective Photosynthsis of Organics from Aqueous Bicarbonate Ions by Quantum Dot Using Visible Light", ACS Energy Lett., 2018, 3, issue 7, pp. 1508-1514, Jun. 1, 2018.*
International Search Report and Written opinion issued in PCT/US2020/058425 on Mar. 10, 2021.
McCluskey, Matthew D. and Anderson Janotti. "Defects in Semiconductors." Journal of Applied Physics 127 (2020): 190401.
Chinese Office Action mailed Mar. 22, 2024, for Application No. CN2020800932211.
Chinese Office Action mailed Jul. 31, 2024, for Application No. CN2020800932211.
Extended European Search Report mailed Dec. 1, 2023, for Application No. EP20883405.
Aksenov et al., Visible photoluminescence of Zn-doped $CuAlS_2$. Appl Phys Lett. Aug. 1992; 1063-5.
Aksenov et al., Photoluminescence studies in $CuAlS_2$:Zn. Jpn J Appl Phys 1993; 32: 4542-9.
Allen et al., Ternary I-III-VI quantum dots luminescent in the red to near-infrared. J Am Chem Soc. Jul. 23, 2008;130(29):9240-1. doi: 10.1021/ja8036349. Epub Jun. 27, 2008.
Bailey et al., Defect physics of $CuGaS_2$. Phys Rev B: Cond Matt. May 2010; 81(20): 1-8.
Bhattacharyya et al., Optical transparency enabled by anomalous stokes shift in visible light-rmitting $CuAlS_2$-based quantum dots. J Phys Chem Lett. Aug. 2, 2018;9(15):4451-4456. doi: 10.1021/acs.jpclett.8b01787. Epub Jul. 25, 2018.
Bergren et al., High-performance $CuInS_2$ quantum dot laminated glass luminescent solar concentrators for windows. ACS Energy Lett 2018. 3: 520-5.
Bruns et al., Next-generation in vivo optical imaging with shortwave infrared quantum dots. Nat Biomed Eng. 2017;1:0056. doi: 10.1038/s41551-017-0056. Epub Apr. 10, 2017.
Caruge et al., Colloidal quantum-dot light-emitting diodes with metal-oxide charge transport layers. Nature Photonics. Apr. 2008; 2: 247-50.
Castro et al., Nanocrystalline chalcopyrite materials ($CuInS_2$ and $CuInSe_2$) via low-temperature pyrolysis of molecular single-source precursors. Chem Mater. 2003; 15: 3142-7.
Castro et al., Synthesis and characterization of colloidal CuInS 2 nanoparticles from a molecular single-source precursor. J Phys Chem B. 2004; 108(33): 12429-35.
Chamarro et al., Optical properties of Mn-doped CdS nanocrystals. J Cryst Growth. 1996; 159: 853-6.
Chichibu et al., Visible and ultraviolet photoluminescence from Cu—III—VI 2 chalcopyrite semiconductors grown by metalorganic vapor phase epitaxy. Jpn J Appl Phys. Part 1. 1997; 36: 1703-14.
Chuang et al., Improved performance and stability in quantum dot solar cells through band alignment engineering. Nat Mater. Aug. 2014;13(8):796-801. doi: 10.1038/nmat3984. Epub May 25, 2014.
Counio et al., Synthesis and photoluminescence of $Cd_{1-x}Mn_xS$ (x ≤ 5) nanocrystals. J Phys Chem B. Jun. 1998; 102(27): 5257-60.
Cox et al., CODATA key values for thermodynamics. Hemisphere Pub Corp. 1989. 6 pages.
Deng et al., High-quality $CuInS_2$/ZnS quantum dots for in vitro and in vivo bioimaging. Chem Mater. 2012; 24(15): 3029-37.
Doherty et al., The nitrogen-vacancy colour centre in diamond. Phys Rep. Jul. 2013; 528(1): 1-45.
Freysoldt et al., Fully ab initio finite-size corrections for charged-defect supercell calculations. Phys Rev Lett. 2009; 102: 1-4.
Freysoldt et al., First-principles calculations for point defects in solids. Rev Mod Phys. 2014; 86(1): 253-305.
Freysoldt et al., Electrostatic interactions between charged defects in supercells. Phys Stat Solid B. May 2011; 248(5): 1067-76.
Fuhr et al., Light emission mechanisms in $CuInS_2$ quantum dots evaluated by spectral electrochemistry. ACS Photonics. 2017; 4(10): 2425-35.
Haeuseler et al., On Aluminium Sulfide: α-$Al_2S_3$ and $Al_2S_3$ (tetr.). Zeitschrift für Naturforschung B. Jan. 1981; 36b: 532-4.
Hahn et al., Untersuchungen über ternäre Chalkogenide. V. Über einige ternäre Chalkogenide mit Chalkopyritstruktur. ZAAC—J Inorg Gen Chem. 1953; 271: 153-70.
Han et al., Triplet Sensitization by "Self-Trapped" Excitons of Nontoxic $CuInS_2$ Nanocrystals for Efficient Photon Upconversion. J Am Chem Soc. Aug. 21, 2019;141(33):13033-13037. doi: 10.1021/jacs.9b07033. Epub Aug. 9, 2019.
Hansen et al., Zinc Thiolate Enables Bright Cu-Deficient Cu—In—S/ZnS Quantum Dots. Small. Jul. 2019; 15(27):e1901462. doi: 10.1002/smll.201901462. Epub May 22, 2019.
Huang et al., First-principles study of $CuAlS_2$ for p-type transparent conductive materials. J Phys D: Appl Phys. Sep. 2010; 43: 395405.
Huynh et al., Hybrid nanorod-polymer solar cells. Science. Mar. 29, 2002;295(5564):2425-7.
Jara et al., Two Distinct Transitions in $Cu_{(x)}InS_2$ Quantum Dots. Bandgap versus Sub-Bandgap Excitations in Copper-Deficient Structures. J Phys Chem Lett. Apr. 21, 2016;7(8):1452-9. doi: 10.1021/acs.jpclett.6b00571. Epub Apr. 6, 2016.
Kim et al., Engineering $InAs_{(x)}P_{(1-x)}$/InP/ZnSe III-V alloyed core/shell quantum dots for the near-infrared. J Am Chem Soc. Aug. 3, 2005;127(30):10526-32.
Klimov et al., Quality factor of luminescent solar concentrators and practical concentration limits attainable with semiconductor quantum dots. ACS Photonics. 2016; 3: 1138-48.
Knowles et al., Bright $CuInS_2$/CdS nanocrystal phosphors for high-gain full-spectrum luminescent solar concentrators. Chem Commun (Camb). Jun. 4, 2015;51(44):9129-32.
Knowles et al., Luminescent Colloidal Semiconductor Nanocrystals Containing Copper: Synthesis, Photophysics, and Applications. Chem Rev. Sep. 28, 2016;116(18):10820-51. doi: 10.1021/acs.chemrev.6b00048. Epub May 9, 2016.
Knowles et al., Singlet-Triplet Splittings in the Luminescent Excited States of Colloidal Cu(+):CdSe, Cu(+):InP, and $CuInS_2$ Nanocrystals: Charge-Transfer Configurations and Self-Trapped Excitons. J Am Chem Soc. Oct. 14, 2015;137(40):13138-47. doi: 10.1021/jacs.5b08547. Epub Oct. 5, 2015.
Korzun et al., T-x phase diagram of the $Cu_2S$-$Al_2S_3$ quasibinary system. J Mater Sci: Mater Elect. Jan. 2005; 16: 25-8.
Kresse et al., Efficiency of ab-initio total energy calculations for metals and semiconductors using a plane-wave basis set. Comp Mater Sci. Jul. 1996; 6(1): 15-50.
Kresse et al., Efficient iterative schemes for ab initio total-energy calculations using a plane-wave basis set. Phys Rev B Condens Matter. Oct. 15, 1996;54(16):11169-11186.
Kresse et al., From ultrasoft pseudopotentials to the projector augmented-wave method. Phys Rev B. Jan. 1999; 59(3): 1758-75.
Li et al., Efficient synthesis of highly luminescent copper indium sulfide-based core/shell nanocrystals with surprisingly long-lived emission. J Am Chem Soc. Feb. 9, 2011;133(5):1176-9. doi: 10.1021/ja108261h. Epub Jan. 5, 2011.
Liborio et al., Chemistry of defect induced photoluminescence in chalcopyrites. The case of $CuAlS_2$. J Appl Phys. 2011; 109: 023519. 9 pages.
Malik et al., A novel route for the preparation of CuSe and $CuInSe_2$ nanoparticles. Adv Mater. 1999; 11: 1441-4.

(56) References Cited

OTHER PUBLICATIONS

Makov et al., Periodic boundary conditions in ab initio calculations. Phys Rev B. 1995; 51(7): 4014-22.

Meech et al., Photophysics of some common fluorescence standards. J Photochem. 1983; 23(2): 193-217.

Meinardi et al., Highly efficient large-area colourless luminescent solar concentrators using heavy-metal-free colloidal quantum dots. Nat Nanotechnol. Oct. 2015;10(10):878-85. doi: 10.1038/nnano.2015.178. Epub Aug. 24, 2015.

Murray et al., Synthesis and characterization of monodisperse nanocrystals and close-packed nanocrystal assemblies. Ann Rev Mater Res. 2000; 30: 545-610.

Nakamura et al., Tunable photoluminescence wavelength of chalcopyrite CuInS2-based semiconductor nanocrystals synthesized in a colloidal system. Chem Mater. 2006; 18(14): 3330-5.

Nelson et al., Valence-band electronic structures of Cu+-doped ZnS, alloyed Cu—In—Zn—S, and ternary CuInS2 nanocrystals: A unified description of photoluminescence across compositions. J Phys Chem C. 2018; 122: 18124-33.

Nelson et al., Computational studies of the electronic structures of copper-doped CdSe nanocrystals: oxidation states, Jahn-Teller distortions, vibronic bandshapes, and singlet-triplet splittings. J Phys Chem C. 2016; 120(10): 5714-23.

Norris et al., Doped nanocrystals. Science. Mar. 28, 2008;319(5871):1776-9.

Panthani et al., Synthesis of CuInS2, CuInSe2, and Cu(InxGa1-x)Se2 (CIGS) nanocrystal "inks" for printable photovoltaics. J Am Chem Soc. Dec. 2008; 130(49): 16770-7.

Perdew et al., Rationale for mixing exact exchange with density functional approximations. Dec. 1996; 105(22): 9982-5.

Perdew et al., Generalized gradient approximation made simple. Phys Rev Lett. Oct. 28, 1996;77(18):3865-3868.

Pinchetti et al., Excitonic pathway to photoinduced magnetism in colloidal nanocrystals with nonmagnetic dopants. Nat Nanotechnol. Feb. 2018;13(2):145-151. doi: 10.1038/s41565-017-0024-8. Epub Dec. 18, 2017.

Pinchetti et al., Spectro-electrochemical Probing of Intrinsic and Extrinsic Processes in Exciton Recombination in I-III-VI2 Nanocrystals. Nano Lett. Jul. 12, 2017;17(7):4508-4517. doi: 10.1021/acs.nanolett.7b02040. Epub Jun. 30, 2017.

Plovnick et al., Growth and properties of cubic crystals in the systems CuAlS and CuGaS. Mat Res Bull. 1977; 12: 219-26.

Pohl et al., Thermodynamics and kinetics of the copper vacancy in CuInSe2, CuGaSe2, CuInS2, and CuGaS2 from screened-exchange hybrid density functional theory. J Appl Phys. 2010; 108: 023509.

Rice et al., Rice WD, McDaniel H, Klimov VI, Crooker SA. Magneto-Optical Properties of CuInS2 Nanocrystals. J Phys Chem Lett. Dec. 4, 2014;5(23):4105-9. doi: 10.1021/jz502154m. Epub Nov. 17, 2014.

Song et al., Efficient white-light-emitting diodes fabricated from highly fluorescent copper indium sulfide core/shell quantum dots. Chem Mater. 2012; 24(10): 1961-7.

Sumner et al., Analysis of optical losses in high-efficiency CuInS2-based nanocrystal luminescent solar concentrators: balancing absorption versus scattering. J Phys Chem C. 2017; 121(6): 3252-60.

Whitham et al., Single-particle photoluminescence spectra, blinking, and delayed luminescence of colloidal CuInS 2 nanocrystals. J Phys Chem C. Jul. 2016; 120: 17136-42.

Wu et al., Nanocrystal-sensitized infrared-to-visible upconversion in a microcavity under subsolar flux. Nano Lett. 2021; 21: 1011-6.

Wu et al., Solid-state infrared-to-visible upconversion sensitized by colloidal nanocrystals. Nat. Photonics. 2016, 10, 31-34.

Xie et al., Formation of high-quality I-III-VI semiconductor nanocrystals by tuning relative reactivity of cationic precursors. J Am Chem Soc. Apr. 22, 2009;131(15):5691-7.

Zang et al., Thick-Shell CuInS2/ZnS Quantum Dots with Suppressed "Blinking" and Narrow Single-Particle Emission Line Widths. Nano Lett. Mar. 8, 2017;17(3):1787-1795. doi: 10.1021/acs.nanolett.6b05118. Epub Feb. 14, 2017.

Zhang et al., Defect physics of the CuInSe2 chalcopyrite semiconductor. Phys Rev B: Cond Matt. Apr. 1998; 57(16): 9642-56.

Zimmer et al., Size series of small indium arsenide-zinc selenide core-shell nanocrystals and their application to in vivo imaging. J Am Chem Soc. Mar. 1, 2006;128(8):2526-7.

Chinese Office Action mailed Dec. 30, 2024, for Application No. CN 202080093221.1.

Pan et al., Material Structure (2nd edition) Beijing: Higher Education Press, pp. 490-492, Sep. 1982. 1 page.

Office Action for CN Application No. 202080093221.1 dated Aug. 6, 2025.

\* cited by examiner

FIG. 1B          FIG. 1C

| Species ↓ | Reaction Progress → | I | II | III |
|---|---|---|---|---|
| Al(acac)$_3$ | | ✓ | ✓ | ✗ |
| RSR | | ✗ | ✓ | ✓✓ |

LIGHT EMITTING NANOCRYSTALS AND METHODS OF MAKING LIGHT EMITTING NANOCRYSTALS

CROSS-REFERENCE TO RELATED APPLICATION

This application claims the benefit of prior filed U.S. Provisional Application No. 62/929,086, filed Oct. 31, 2019, which is incorporated by reference in its entirety.

FEDERAL SPONSORSHIP

This invention was made with Government support under Grant No. DE-FG02-07ER46454 awarded by the Department of Energy. The Government has certain rights in the invention.

FIELD OF THE INVENTION

The invention relates to light emitting nanocrystals.

BACKGROUND

Nanocrystals can be light emitting materials.

SUMMARY

In one aspect, a plurality of nanocrystals can have the formula: Cu—B—$X_2$, where B is In, Al, or Fe and X is S or Se.

In another aspect, a method of making a semiconductor nanocrystal can include heating a first mixture including: a first M donor including a Group I element; and a second M donor including Al or Fe; and adding a first E donor including a Group VI element to the first mixture, thereby forming a population of nanocrystal cores having the formula: Cu—B—$X_2$, where B is In, Al, or Fe and X is S or Se.

In another aspect, a semiconductor nanocrystal can include a core including a IB-IIIA-VIA semiconductor material, wherein the nanocrystal has a luminescence quantum yield of at least 10%, wherein the nanocrystal has a peak luminescence emission wavelength in the range of 380 nm to 560 nm, wherein the nanocrystal is a defective nanocrystal, wherein the group IB element is copper and the group IIIA element is indium, aluminum, or iron, and the group VIA element is sulfur or selenium.

In certain circumstances, the nanocrystal can include a zinc sulfide over coating.

In certain circumstances, B can be Al.

In certain circumstances, B can be Fe.

In certain circumstances, the nanocrystals can defective nanocrystals.

In certain circumstances, the nanocrystals can be doped with zinc.

In certain circumstances, the nanocrystals can have an emission of between 380 and 560 nm, for example, between 420 and 550 nm.

In certain circumstances, the nanocrystals can have an emission efficiency of at least 10%.

In certain circumstances, the nanocrystals can have a size of between 2 nm and 20 nm, for example, between 3 nm and 10 nm.

In certain circumstances, the nanocrystals can be $CuAlS_2$ or $CuAl_5S_8$ nanocrystals.

In certain circumstances, the method can include adding a Zn source.

In certain circumstances, the Zn source can be a zinc thiolate.

In certain circumstances, the IB-IIIA-VIA semiconductor material can be $CuAlS_2$ or $CuAl_5S_8$.

Other aspects, embodiments, and features will be apparent from the following description, the drawings, and the claims.

BRIEF DESCRIPTION OF DRAWINGS

FIGS. 1A-1D are drawings depicting synthesis and characteristics of the nanocrystals described herein. FIG. 1A shows a synthetic reaction scheme utilized for the synthesis of blue light emitting DNCs. FIG. 1B shows an elemental composition of reaction mixture versus purified end product as determined by ICP-OES. FIG. 1C shows a photograph of 17% QY DNCs with and without ultraviolet (UV) light excitation. FIG. 1D shows a qualitative description of reaction mixture components determined by $^1H$ and $^{13}C$ NMR at three stages of reaction: I (prior to vacuum and heating, immediately after addition of precursors), II (reaction mixture after vacuum and 180° C. growth step), and III (final reaction mixture after addition of $Zn(RS)_2$ and 240° C. growth step, but prior to purification) derived from data presented in FIGS. 8, 9, and 10.

FIG. 4A shows absorbance (normalized to ~370 nm) and associated PL of DNCs. FIG. 4B shows absorbance (normalized to ~440 nm) and associated PL of DNCs.

DETAILED DESCRIPTION

Figure 1A:
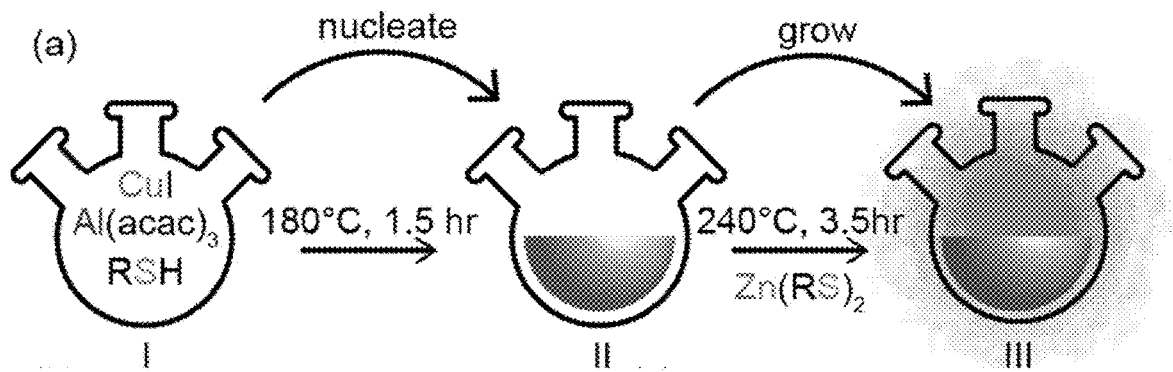

Cu—Al—S/ZnS nanocrystals give rise to bright blue photoluminescence arising from highly localized, optically-active defect states.

Copper-based ternary chalcogenide ($Cu$—B—$X_2$, where B=In, Al, Fe, etc. and X=S, Se) nanocrystals (NCs) are attractive low-toxicity alternative to traditional Cd- and Pb-based NCs. Cu—In—S NCs are effectively the only studied ternary NC material, with a unique photoluminescence (PL) mechanism involving bright defect states, which ultimately makes Cu—In—S NCs useful in luminescent solar concentrators (LSCs). However, there has been little work to exploit the role of bright crystalline defect states in ternary NCs, which are typically composed of more Earth-abundant elements (Indium, In, is rare and expensive). To create effective emitters in In-free ternary NC materials, a synthetic method that creates useful crystalline defects is necessary to impart useful PL properties that might find application in light emitting devices, such as LSCs. Here, a method to synthesize colloidal nanocrystals with the purposeful inclusion of native crystalline defects in Cu—Al—S/ZnS NCs such that they exhibit efficient light emission through well-defined electronic states with fast photoluminescence lifetimes is described. The methods and results presented here provide a feasible low-toxicity, readily-produced material that emits bright blue light.

Nanocrystals composed of substantially non-toxic materials can have quantum yields greater than 5%, greater than 10%, greater than 15%, greater than 20%, greater than 25%, greater than 30%, greater than 35%, or greater than 45%. Nanocrystals composed of substantially non-toxic materials can have emission wavelengths spanning the visible region, such as, for example, emission wavelengths in the range of 380 and 560 nm, between 420 and 550 nm, e.g., 450 nm. The nanocrystals can have a deviation from mean size of no greater than 25% rms, or a deviation from mean size of no greater than 15% rms.

The nanocrystal can be a member of a nanocrystal population having an emission FWHM of no greater than 0.35 eV, or of no greater than 0.2 eV.

In one aspect, the first 1-III-VI semiconductor material can include copper. The first I-III-VI semiconductor material can include aluminum or iron. The core can be substantially free of toxic elements. The material can be doped with zinc. The material can be a defective nanocrystal.

The nanocrystal can include a shell or over coating on a surface of the core, the over coating including a second semiconductor material. The nanocrystal can include a ligand on a surface of the semiconductor nanocrystal. The over coating can be a cubic ZnS shell or a hexagonal ZnS shell. The nanocrystal can be water soluble.

In another aspect, a method of making a semiconductor nanocrystal includes heating a first mixture including: a first M donor including copper, and a second M donor including aluminum or zinc, and adding a first E donor including a thiol to form the first mixture which can be heated to nucleate particles. A second heating step to grow the nanocrystals can take place at a higher temperature than the nucleation temperature. The second heating step can include adding a zinc source. The product is a population of nanocrystal cores including a first I-III-VI semiconductor material. The first temperature can be between 150 C and 200 C, which can be held for 30 minutes to 2 hours, for example around 1.5 hours. The second temperature can be between 230 C and 300 C, which can be held for 2.5 to 6 hours, for example around 3 to 4 hours.

The method can include exposing the nanocrystal to a ligand having an affinity a surface of the semiconductor nanocrystal. The semiconductor nanocrystal can be water soluble after exposure to the ligand.

The nanocrystals have a size of between 1 nm and 50 nm, preferable, 2 and 20 nm, for example, about 3, 4, 5, 6, 7, or 8 nm in diameter.

The nanocrystal can be a member of a population of nanocrystals having a narrow size distribution. The nanocrystal can be a sphere, rod, disk, or other shape. The nanocrystal can include a first semiconductor material. The nanocrystal can include a first semiconductor material having the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof. The first semiconductor material can include a Group II-VI compound, a Group II-V compound, a Group III-VI compound, a Group III-V compound, a Group IV-VI compound, a Group I-III-VI compound, a Group II-IV-VI compound, a Group II-IV-V compound, or mixtures thereof. For example, the first semiconductor material can include for example, ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof.

In some embodiments, the nanocrystal includes a first semiconductor material including a Group I-III-VI compound. For example, the first semiconductor material can include for example, a copper aluminum sulfide such as a doped copper aluminum sulfide, or a copper iron sulfide such as a doped copper aluminum sulfide, which can be an alloy with zinc. The semiconductor material can be $CuAlS_2$ or $CuAl_5S_8$.

The nanocrystal can include a second semiconductor material. The second semiconductor material can a composition different from the composition of the first semiconductor material. The first and second semiconductor materials can be selected to provide a desired band structure, such as a type I or a type II heterostructure. The second semiconductor material can be adjacent to the first semiconductor material, such that a junction is formed. The junction can be abrupt or graded. In a graded junction, the first material blends with the second material in the junction, providing a graded change in material. In contrast, in an abrupt junction there is little or substantially no blending of the materials.

The junction between two semiconductor materials can have different configurations depending on the shape of the nanocrystal. For example, a spherical nanocrystal can have a spherical core of a first semiconductor material coated with a shell of a second semiconductor material. A rod shaped nanocrystal can a rod of a first semiconductor material and a second semiconductor material. The second semiconductor material can coat the length and ends of the rods substantially evenly. Alternatively, the length and ends of the rod can be coated to different degrees. In particular the ends of the rod can coated to a greater degree than the length of the rod. The ends of the rod each can be coated by an approximately spherical region of a second semiconductor material. In this case, the nanocrystal can have a barbell shape.

The second semiconductor material of the nanocrystal can include a Group II-VI compound, a Group II-V compound, a Group III-VI compound, a Group III-V compound, a Group IV-VI compound, a Group I-III-VI compound, a Group II-IV-VI compound, a Group II-IV-V compound, or mixtures thereof. For example, the second semiconductor material can include ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof. For example, ZnS, ZnSe or CdS overcoatings can be grown on CdSe or CdTe nanocrystals.

The emission from the nanocrystal can be a narrow Gaussian emission band that can be tuned through the complete wavelength range of the ultraviolet, visible, or infrared regions of the spectrum by varying the size of the nanocrystal, the composition of the nanocrystal, or both. For example, CdSe can be tuned in the visible region and InAs can be tuned in the infrared region.

The population of nanocrystals can have a narrow size distribution. The population can be monodisperse and can exhibit less than a 15% rms deviation in size of the nanocrystals, preferably less than 10%, more preferably less than 5%. Spectral emissions in a narrow range of between 10 and 150 nm full width at half max (FWHM) can be observed (in other words, FWHM of less than 0.05 eV, or of less than 0.03 eV). Semiconductor nanocrystals can have emission quantum efficiencies of greater than 2%, 5%, 10%, 20%, 40%, 60%, 70%, or 80%.

The most well studied nanocrystal system, cadmium selenide, includes toxic cadmium. See, e.g., Murray C B, et al. *Ann. Rev. Matrl. Sci.* 2000, 30: 545-610, which is incorporated by reference in its entirety. Nakamura and Castro have prepared nanocrystals from nontoxic materials, but quantum yields in the range of 0.1% to 5%, or less. Nakamura H, et al. *Chem. Matr.* 2006 18:3330-3; Castro, S. et al. *J. Phys. Chem. B* 2004 108:1242-35; and Castro et al. *Chem Matrl* 2003, 15, 3142-5; each of which is incorporated by reference in its entirety. Nanocrystals that are composed of non-toxic materials, are highly luminescent (e.g., having a luminescence quantum yield of 10% or greater) and are prepared in narrow size distributions can be useful in applications such as biological imaging agents, photovoltaic cells, and optoelectronic devices. See, for example, Kim S-W, et al., *JACS* 2005, 127: 10526-10532; Zimmer J P, et al., *JACS* 2006, 128: 2526-2527; and Huynh W U, et al., *Science* 2002, 295: 2425-2427, each of which is incorporated by reference in its entirety.

The nanocrystal can composed of substantially non-toxic materials. For example, the nanocrystal can be substantially free of toxic elements such as cadmium, mercury, arsenic, thallium and lead.

The method of manufacturing a nanocrystal is a colloidal growth process and can produce a monodisperse particle population. Colloidal growth occurs by rapidly injecting an M donor(s) and an E donor(s) into a hot coordinating agent. In another variation, the M donor or M donors are dissolved in a hot coordinating agent, and an E donor or E donors are rapidly injected. The injection produces a nucleus that can be grown in a controlled manner to form a nanocrystal. The reaction mixture can be gently heated to grow and anneal the nanocrystal. Both the average size and the size distribution of the nanocrystals in a sample are dependent on the growth temperature. The growth temperature necessary to maintain steady growth increases with increasing average crystal size. Preparation and manipulation of nanocrystals are described, for example, in U.S. Pat. No. 6,322,901, which is incorporated by reference in its entirety.

The nanocrystal is a member of a population of nanocrystals. As a result of the discrete nucleation and controlled growth, the population of nanocrystals obtained can have a narrow, monodisperse distribution of sizes. The process of controlled growth and annealing of the nanocrystals in the coordinating agent that follows nucleation can also result in uniform surface derivatization and regular core structures. As the size distribution sharpens, the temperature can be raised to maintain steady growth. By adding more M donor or E donor, the growth period can be shortened.

The M donor(s) can be an inorganic compound, an inorganic compound can be a salt (e.g., a carboxylate salt, an acetylacetonate salt, a metal halide, a metal oxide, a metal thiolate, a metal alkoxide, and the like). For example, the salt can be a copper halide, such as copper iodide, an aluminum halide or acetylacetonate, or a zinc salt, such as a zinc thiolate. The salt can be combined with a coordinating agent, such as an amine. See, for example, U.S. Pat. No. 6,576,291, which is incorporated by reference in its entirety. M can be zinc, copper, magnesium, aluminum, or indium. The E donor(s) can be a compound capable of reacting with the M donor to form a material. Typically, the E donor is a chalcogenide donor or a pnictide donor, such as a phosphine chalcogenide, a bis(silyl) chalcogenide, dioxygen, an ammonium salt, or a tris(silyl) pnictide. Suitable E donors include alkyl thiols, dioxygen, bis(trimethylsilyl) selenide ((TMS)$_2$Se), trialkyl phosphine selenides such as (tri-n-octylphosphine) selenide (TOPSe) or (tri-n-butylphosphine) selenide (TBPSe), trialkyl phosphine tellurides such as (tri-n-octylphosphine) telluride (TOPTe) or hexapropylphosphorustriamide telluride (HPPTTe), bis(trimethylsilyl)telluride ((TMS)$_2$Te), bis(trimethylsilyl)sulfide ((TMS)$_2$S), a trialkyl phosphine sulfide such as (tri-n-octylphosphine) sulfide (TOPS), an ammonium salt such as an ammonium halide (e.g., NH$_4$Cl), tris(trimethylsilyl) phosphide ((TMS)$_3$P), tris(trimethylsilyl) arsenide ((TMS)$_3$As), or tris(trimethylsilyl) antimonide ((TMS)$_3$Sb). In certain embodiments, the M donor and the E donor can be moieties within the same molecule.

A coordinating agent can help control the growth of the nanocrystal. The coordinating agent is a compound having a donor lone pair that, for example, has a lone electron pair available to coordinate to a surface of the growing nanocrystal. The coordinating agent can be a solvent. Solvent coordination can stabilize the growing nanocrystal. Typical coordinating agents include alkyl phosphines, alkyl phosphine oxides, alkyl phosphonic acids, or alkyl phosphinic acids, however, other coordinating agents, such as pyridines, furans, and amines may also be suitable for the nanocrystal production. Examples of suitable coordinating agents include pyridine, tri-n-octyl phosphine (TOP) and tri-n-octyl phosphine oxide (TOPO). Technical grade TOPO can be used.

Nanocrystal shape can be determined by synthesis conditions, notably by the coordinating solvent(s) present during nanocrystal synthesis. The nanocrystal can be a sphere, rod, disk, or other shape. See, e.g., U.S. Pat. Nos. 6,225,198; 6,306,736; and 6,855,202, each of which is incorporated by reference in its entirety. Nanocrystal shape can be further controlled by the conditions under which a second semiconductor material is added to the nanocrystal.

Size distribution during the growth stage of the reaction can be estimated by monitoring the absorption line widths of the particles. Modification of the reaction temperature in response to changes in the absorption spectrum of the particles allows the maintenance of a sharp particle size distribution during growth. Reactants can be added to the nucleation solution during crystal growth to grow larger crystals. By stopping growth at a particular nanocrystal average size, a population having a desired average nanocrystal size can be obtained. For example, a population of rod-shaped nanocrystals can have an average length of between 3 nm and 100 nm, such as between 5 nm and 40 nm. The population can have an average radius of between 1 nm and 10 nm, such as between 1.5 nm and 5 nm.

The particle size distribution can be further refined by size selective precipitation with a poor solvent for the nanocrystals, such as methanol/butanol as described in U.S. Pat. No. 6,322,901, incorporated herein by reference in its entirety. For example, nanocrystals can be dispersed in a solution of 10% butanol in hexane. Methanol can be added dropwise to this stirring solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected nanocrystal population can have no more than a 15% rms deviation from mean size, preferably 10% rms deviation or less, and more preferably 5% rms deviation or less.

The outer surface of the nanocrystal can include a layer of compounds derived from the coordinating agent used during the growth process. The surface can be modified by repeated exposure to an excess of a competing coordinating group to form an overlayer. For example, a dispersion of the nanocrystal can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the nanocrystal, including, for example, phosphines, thiols, amines and phosphates. The nanocrystal can be exposed to short chain polymers which exhibit an affinity for the surface and which terminate in a moiety having an affinity for a suspension or dispersion medium. Such affinity improves the stability of the suspension and discourages flocculation of the nanocrystal.

A cap including a second semiconductor material can be added to the nanocrystal. An capping process is described, for example, in U.S. Pat. No. 6,322,901, which is incorporated by reference in its entirety. By adjusting the temperature of the reaction mixture during capping and monitoring the absorption spectrum of the core, capped materials having high emission quantum efficiencies and narrow size distributions can be obtained. The shape of the cap can depend on the shape of the initial nanocrystal and the capping conditions used. For example, a cap grown on an approximately spherical nanocrystal can also be approximately spherical. In this case, the cap can substantially coat the spherical nanocrystal. If the initial nanocrystal is rod-shaped, the cap can be grown primarily on the ends of the rod and very little of the second semiconductor material added along the axis of the rod. A rod-shaped nanocrystal can be capped with a rod-shaped cap, or with an approximately spherical cap. Capping conditions, such as solvent composition and temperature, can determine the shape of the cap. For example, when caps are added under conditions that favor rod-shaped growth, rod-shaped caps can be formed; in contrast, approximately spherical caps are formed when the capping conditions favor approximately spherical growth.

It can be advantageous to form the nanocrystals in a single pot reaction. As discussed above, the nanocrystals can be purified by size-selective precipitation. After purification the nanocrystals can be treated with an etching agent. The etching agent can reduce the number of defect sites on the nanocrystals. Defect sites can act as undesired nucleation sites during addition of a second semiconductor nanocrystal. In making barbell-shaped nanocrystals, nucleation is desired at the ends of rods, but defect sites can cause nucleation along the length of a rod. Because the etching agent reduces the number of defect sites, the resulting barbells will have fewer warts along the length of the rods than barbells prepared without a prior etching treatment. The etching agent can be an amine, such as a primary amine, e.g., octylamine. An etching agent can be included during addition of a second semiconductor material to a nanocrystal.

Two-pot synthesis of nanocrystals can improve (compared to one-pot synthesis) the quality of the heterojunction by minimizing contamination of the one material with the other material. Adding the nanocrystals at temperatures normally used for core growth (rather than nucleation) can reduce over coating of a rod (e.g., along the length of the rod) by the second semiconductor material.

Transmission electron microscopy (TEM) can provide information about the size, shape, and distribution of the nanocrystal population. Powder X-ray diffraction (XRD) patterns can provided the most complete information regarding the type and quality of the crystal structure of the nanocrystals. Estimates of size are also possible since particle diameter is inversely related, via the X-ray coherence length, to the peak width. For example, the diameter of the nanocrystal can be measured directly by transmission electron microscopy or estimated from X-ray diffraction data using, for example, the Scherrer equation. It also can be estimated from the UV/Vis absorption spectrum.

Colloidal quantum dots have been widely studied in the past thirty years, but all preparations can be broadly classified as either defect-free NCs or as doped NCs, by which a non-native dopant is incorporated into the crystal lattice. Defect-free NCs do not have homogeneous electronic levels between all individual particles due to size heterogeneity, but can show fast photoluminescence lifetimes. Alternatively, doped NCs can have homogeneous electronic levels associated with the nature of the dopant (i.e. orange light from d-d transitions in $Mn^{2+}$ doped NCs), but suffer from long photoluminescence lifetimes. Native defect-containing ternary ($ABX_2$) material composition NCs with well-defined electronic states arising from intrinsic crystalline defects provide necessary quantum information processing characteristics in a compact, scalable form. In both the defect-free and dopant-containing classes of NCs, synthetic methods utilize precursors with fast decomposition kinetics such that the rate limiting step arises from recurrent elemental addition to each NC, yielding NCs with few defects. In contrast, this method utilizes an Al-rich chemical environment paired with a single-source precursor, decomposed at low temperature, to prepare a kinetic NC product that contains crystalline defects Al-rich compositional identity. This method is a two-part, single pot heat-up reaction where an initial partial decomposition of Aluminum and Copper precursors are decomposed in a sulfur-rich thiol environment to yield NC nuclei, followed by addition of a single source Zinc precursor and elevated temperature to realize the final product. Ultimately, this method yields bright blue light emission from ~4 nm diameter defective nanocrystals (DNCs).

NCs with fixed energy levels, efficient light emission, and simple means of preparation are crucial to the future of optical quantum information processing. These NCs provide a means of delivering similar optical properties that might find use in quantum computers via a simple synthetic method resulting in an earth-abundant elemental composition material. This synthetic method might be generalizable and capable of creating useful optical materials without invoking toxic elemental compositions usually required for bright NCs.

Colloidal QDs have promising potential for optical quantum information processing technology due to the scalability of solution-based synthetic methods. For example, NV-centers in diamond are commonly used for quantum information processing but require poorly-scalable >800° C. explosive detonation-based preparation methods. Furthermore, colloidal solutions provide a means for device production via solvent-based methods not applicable to current technology. This material and synthetic method has ready applicability to quantum information processing and also to the future production of new defect-containing materials requiring kinetic control of synthetic conditions to provide control over density and character of intrinsic defects in multinary composition NCs.

Copper-based ternary (I-III-VI) chalcogenide nanocrystals (NCs) are compositionally-flexible semiconductors that do not contain Lead (Pb) or Cadmium (Cd). Cu—In—S NCs are the dominantly studied member of this important materials class and have been reported to contain optically-active defect states. However, there are minimal reports of In-free compositions that exhibit efficient photoluminescence (PL). Here, a novel solution-phase synthesis of ~4 nm defective nanocrystals (DNCs) composed of Copper, Aluminum, Zinc, and Sulfur with ~20% quantum yield and an attractive PL maximum of 450 nm is reported. Extensive spectroscopic characterization suggests the presence of highly localized electronic states resulting in reasonably fast PL decays (~1 ns), large vibrational energy spacing, small Stokes shift, and temperature-independent PL linewidth and PL lifetime (between room temperature and ~5K). Furthermore, density functional theory (DFT) calculations suggest PL transitions arise from defects within a $CuAl_5S_8$ crystal lattice, which supports the experimental observation of highly-localized states. The results reported here provide a new material with unique optoelectronic characteristics that is an important analog to well-explored Cu—In—S NCs.

Copper-based ternary chalcogenide NCs are low-toxicity alternatives to Cd- and Pb-based quantum dots, both of which have been widely studied for photon down-conversion (refs. 1-5), photon up-conversion (refs. 6, 7), luminescent solar concentrators (LSCs) (refs. 8-11), solar cells (refs. 12, 13), light-emitting diodes (refs. 14, 15), and bio-imaging (refs. 16, 17). Over the past two decades, Cu—In—S ternary NCs have been synthetically optimized and commercialized (ref. 18). Uniquely, Cu—In—S NCs have an intra-band gap state capable of efficient radiative recombination, which leads to a large Stokes shift that is useful for reabsorption-sensitive applications like LSCs (refs. 19, 20). However, In-free ternary NCs (e.g. Cu—Al—S, Cu—Fe—S, etc.) have received relatively little attention. Their optical properties are unexplored and in particular, the role that defects and in-gap states play in these materials are largely unknown.

The optical properties of Cu—In—S NCs are readily explained by the presence of an intra-band gap state, which has also been observed in a variety of dopant-containing NCs. In general, intra-band gap states can be introduced into NCs by incorporation of either intrinsic or extrinsic dopants. Extrinsic doping of NCs has been shown to result in efficient PL with large Stokes shift via incorporation of dilute quantities of $Cu^+$, $Ag^{+*}$, $Mn^{2+}$, and other metal ions (refs. 21-26). However, extrinsic dopant-containing NCs necessarily require a host crystal matrix, which has historically been Cd- or Pb-based, thereby presenting toxicity issues. While there are Zn- and other metal-based crystal hosts for extrinsically doped NCs, there is an obvious demand for new materials containing intra-band gap states while maintaining a favorable elemental composition. Incorporation of an intrinsic defect state is a simple way to introduce useful intra-band gap states without sacrificing the NC elemental composition, especially for Cu-based NCs (ref 27). As a result, Cu—In—S NCs stand to compete with and replace Cd- and Pb-based NCs for some optoelectronic applications. However, the inclusion of Indium (In) may limit Cu—In—S NC applications due to cost. Therefore, it is important to explore other members of the Copper-based ternary chalcogenide NC material class to expand the library of low-toxicity and Earth-abundant NC materials.

Exploration of other members of the Cu-based ternary materials class can serve to better understand the properties of Cu—In—S NCs. For instance, the PL mechanism in Cu—In—S NCs is still a subject of debate. More specifically, Cu—In—S NCs have been suggested to exhibit PL via either a $Cu^+/Cu^{2+}$ redox couple state or a Cu-related defect state (refs. 25, 28 and 29). A variety of single particle (refs. 25, 28), ultrafast (ref. 30), magneto-optical (refs. 21, 31), spectroelectrochemical (refs. 32, 33), and temperature-dependent (ref. 21) spectroscopies have been applied to understand the source of broad, efficient PL from Cu—In—S NCs with varying degrees of success. However, there has been little manipulation of the elemental composition of ternary NCs beyond the use of $In^{3+}$, which might otherwise provide important insight into their optical properties.

More broadly, it is not known if all members of the Copper-based ternary chalcogenide NC family share similar optical properties, which might expand the utility of the material class while helping to understand Cu—In—S NC optical properties. As an example, the $Cu^+$-related defect state in Cu—In—S NCs acts as a hole trap, giving rise to long PL lifetimes which may not be reflected in other members of the material class (ref. 19). For instance, Cu—Al—S-based thin films have been reported to have fast PL lifetimes (refs. 34, 35).

Here the synthesis of Cu—Al—S/ZnS NCs is reported, which are largely unexplored apart from one report of efficient PL from Cd-containing Cu—Al—S NCs via non-defect states and another report of Cu—Al—S/ZnS NCs with a hexagonal ZnS shell with <3% QY (refs. 36, 37). Through a different reaction scheme (i.e. temperature, time, shell precursor identity), PL properties are reported that reflect the aforementioned reports for the core-only Cu—Al—S NCs for a substantially brighter Cu—Al—S/ZnS NC product with cubic ZnS shells while also providing insights into the PL mechanism. Further, a variety of spectroscopic insights and theoretical calculations are provided to understand the observed optical properties.

Based on the hypothesis of bright defect states in Cu-based ternary NCs, the composition ratio was manipulated between $Cu^+$ and $Al^{3+}$ to create defect states. A heat-up type method was devised to first initiate particle growth, followed by over coating and alloying with ZnS, which was found empirically to yield a highly emissive colloid.

Inspired by the general synthetic methods developed for In-based ternary nanocrystals, the method utilizes an initial nucleation step followed by addition of a single source Zn precursor (Zn-thiolate) to grow blue light emitting DNCs (refs. 1, 4, 18). Elemental analysis shows the minimal deviation in elemental composition between reaction mixture components and the isolated, purified DNCs (FIG. 1B). To provide a visual example of the appearance of DNCs, FIG. 1C highlights the blue emitted light of a representative DNC sample with 17% quantum yield (QY) with and without UV light excitation.

Figure 1D:
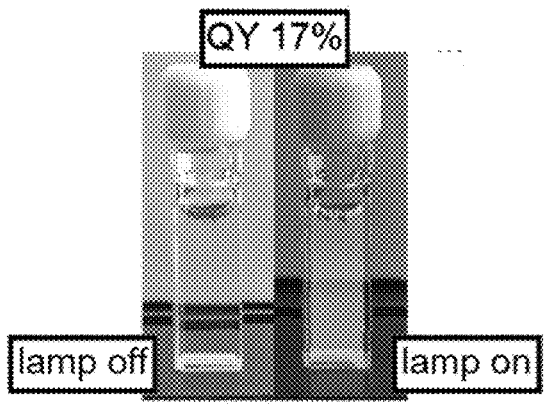
Figure 1D:
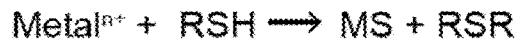
Figure 8:
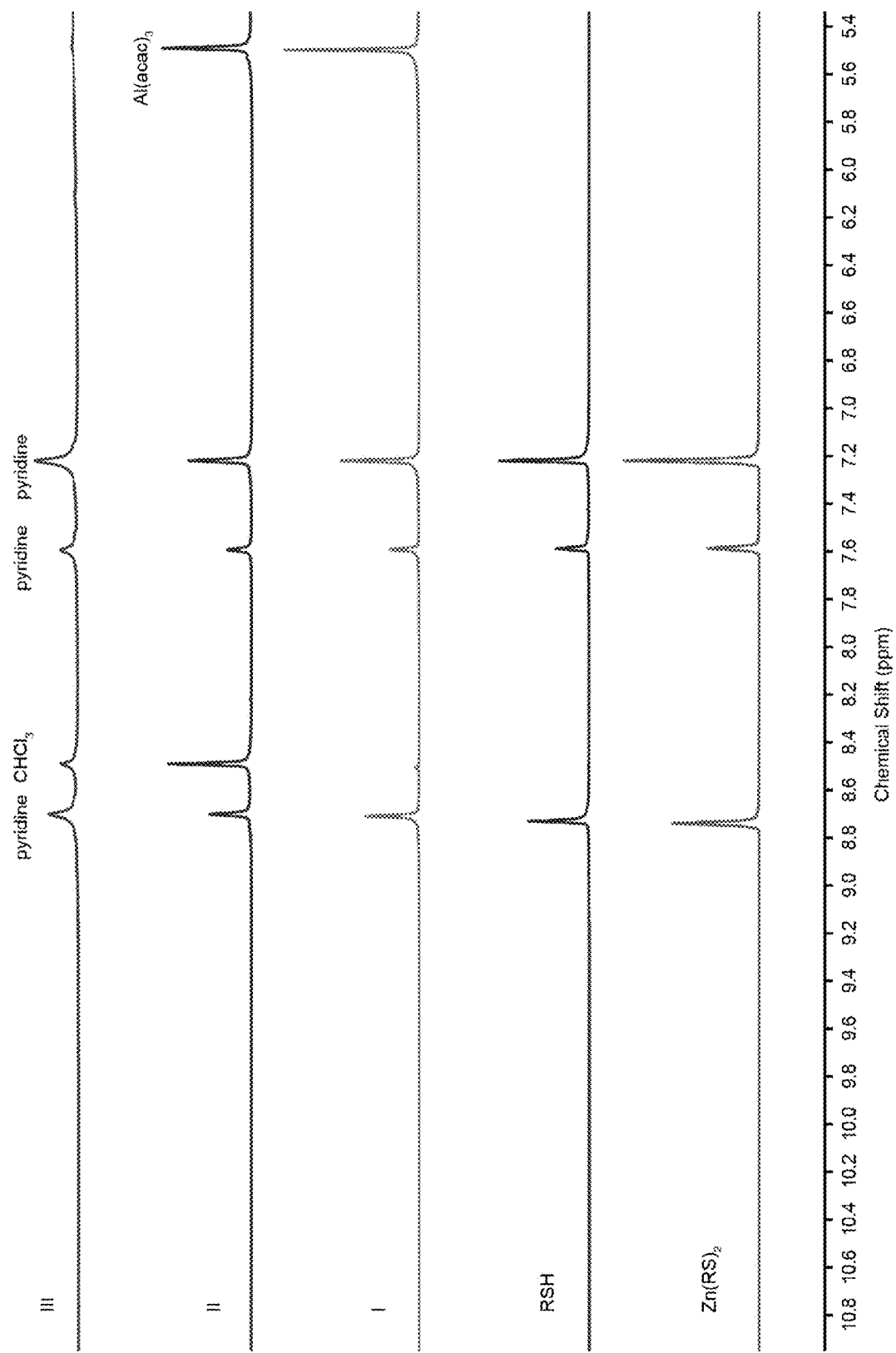
FIG. 8 depicts $^1$H NMR spectra of reaction mixture aliquots without filtration or purification acquired during a typical DNC during this synthesis, with I-III being those depicted in FIG. 1 of the main text, RSH being 1-dodecanethiol, and $Zn(RS)_2$ being Zinc thiolate. (III) is the final DNC reaction mixture, (II) is the reaction mixture after degassing and heating to 180° C. for 90 minutes, (I) is the reaction mixture prior as first added to the solution, without vacuum or heating. $CHCl_3$ present in aliquots is from small quantities present during cleaning of the aliquot syringe.
Figure 9:
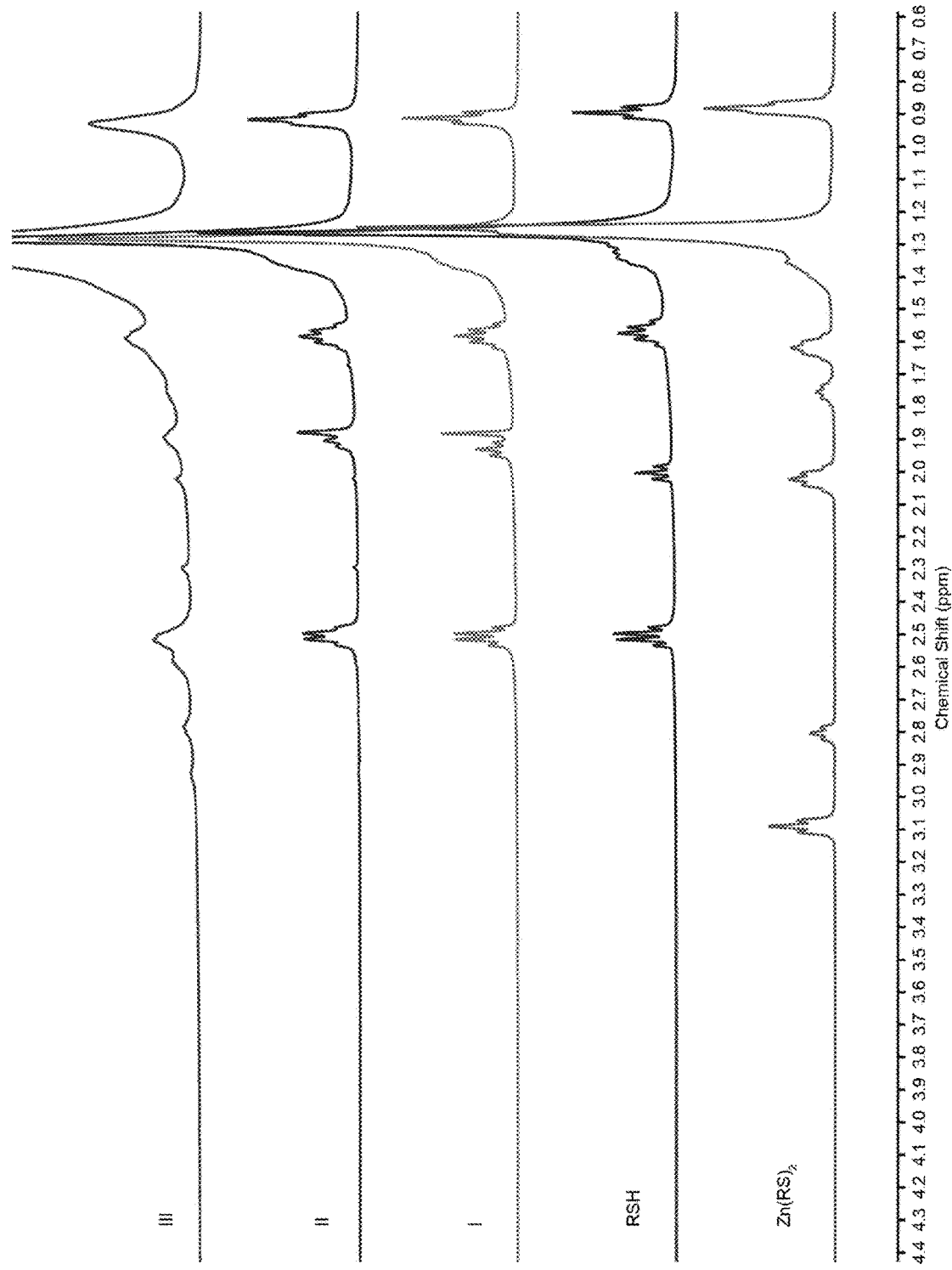
FIG. 9 depicts $^1$H NMR spectra of reaction mixture aliquots without filtration or purification acquired during a typical DNC during this synthesis, with I-III being those depicted in FIG. 1 of the main text, RSH being 1-dodecanethiol, and $Zn(RS)_2$ being Zinc thiolate. (III) is the final DNC reaction mixture, (II) is the reaction mixture after degassing and heating to 180° C. for 90 minutes, (I) is the reaction mixture prior as first added to the solution, without vacuum or heating. $CHCl_3$ present in aliquots is from small quantities present during cleaning of the aliquot syringe.
Figure 10:
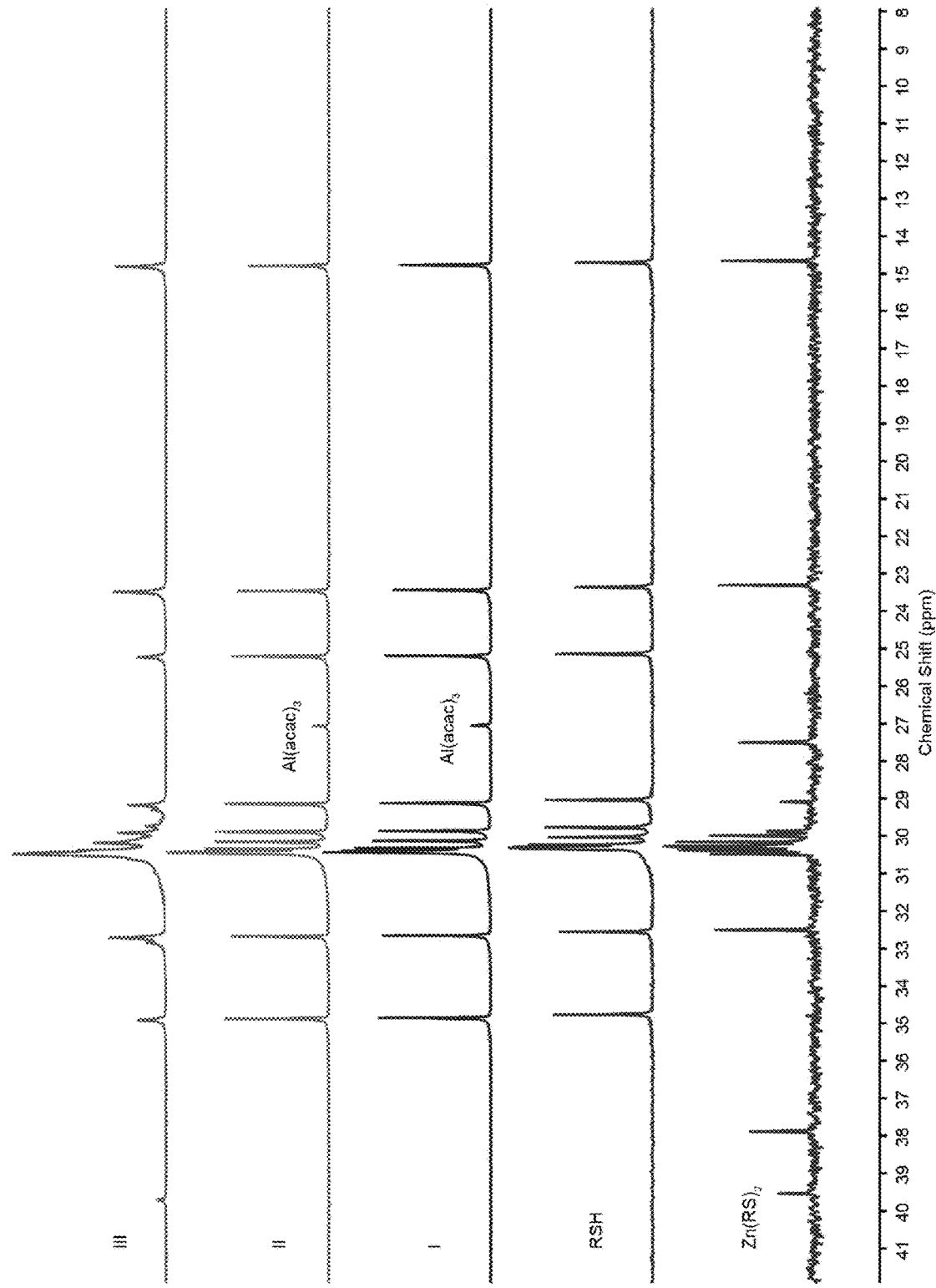
FIG. 10 depicts $^{13}$C NMR spectra of reaction mixture aliquots without filtration or purification acquired during a typical DNC during this synthesis, with I-III being those depicted in FIG. 1 of the main text, RSH being 1-dodecanethiol, and $Zn(RS)_2$ being Zinc thiolate. (III) is the final DNC reaction mixture, (II) is the reaction mixture after degassing and heating to 180° C. for 90 minutes, (I) is the reaction mixture prior as first added to the solution, without vacuum or heating. $CHCl_3$ present in aliquots is from small quantities present during cleaning of the aliquot syringe.

The high temperatures of NC synthesis can sometimes result in the formation of unwanted organic and inorganic byproducts. As a result, chemical analysis was performed to track the presence of the two most relevant species: Al(acac)$_3$, the Aluminum precursor, and the decomposition product (RSR, thioether) of the sulfur precursor during the course of the reaction via $^1$H and $^{13}$C NMR (FIG. 1D). This chemical analysis revealed the formation of the thioether (RSR) during the nucleation period (between Steps I and II shown in FIG. 1A), which implies the formation of some metal sulfide nuclei between steps I and II, while analysis also shows incomplete consumption of Al(acac)$_3$ during this step. Similar NMR-based monitoring of the reaction mixture between stage II and III shows full consumption of Al(acac)$_3$ and additional formation of thioether, indicating complete conversion of Al(acac)$_3$ to Aluminum-related Sulfides. Additionally, no NMR signals in the aromatic region of the $^1$H NMR were observed, suggesting that the observed optical properties are unlikely to arise from the presence of conjugated π systems formed as a byproduct of the synthesis (FIG. 8).

Figure 2:
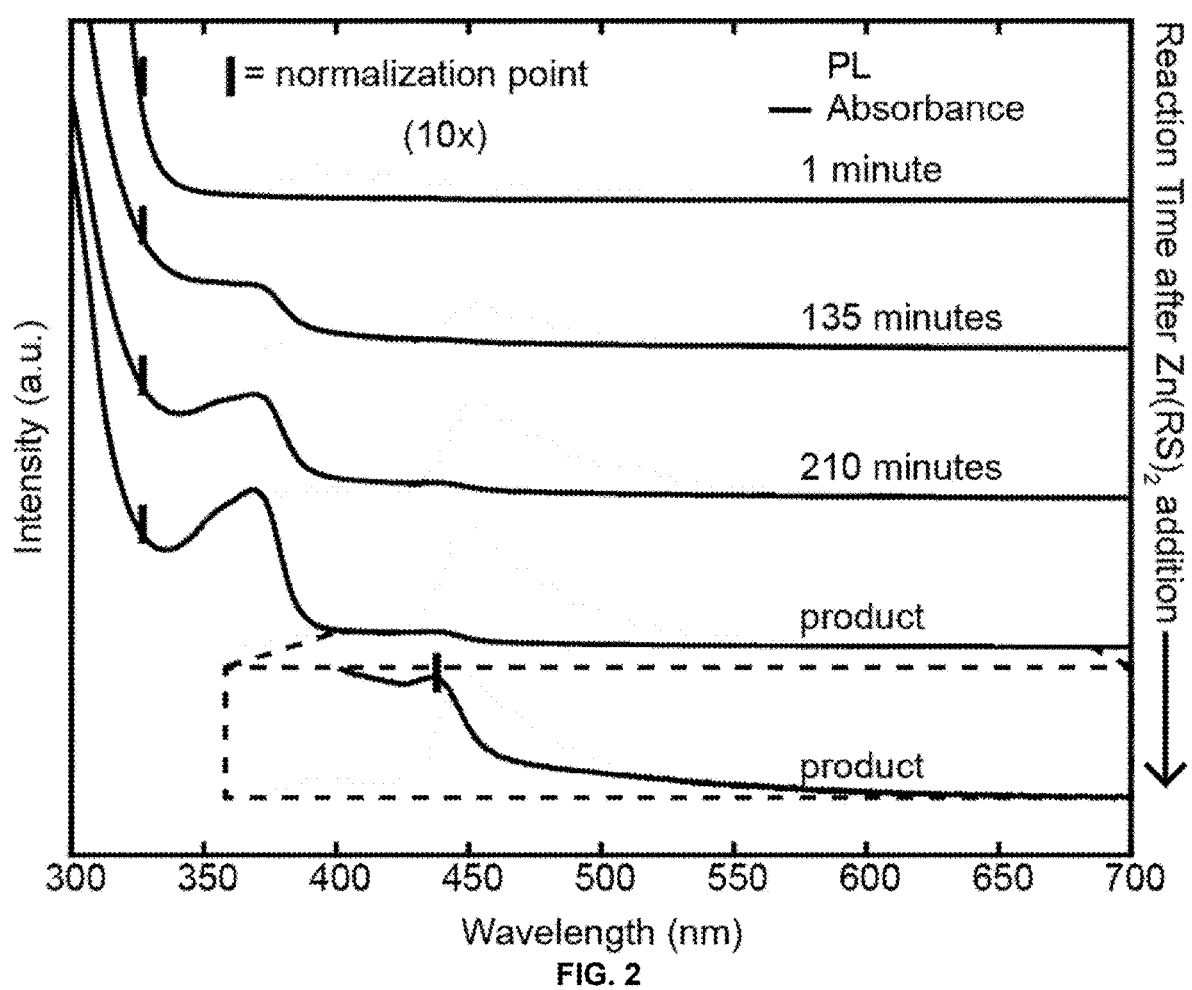
FIG. 2 is a graph depicting a time course plot of absorbance, normalized to 325 nm for the top four traces and normalized to 440 nm for the bottom trace to illustrate the growth of defect-related transitions growing in at ~370 nm and ~440 nm. Similarly, fluorescence is plotted and normalized to the absorbance value at the excitation wavelength of 350 nm (except for the 1-minute time point, which was expanded 10× for the reader).

FIG. 2 illustrates the evolution of optical properties during a representative synthesis of DNCs between steps II and III, where time begins after the nucleation stage and upon the addition of the Zinc precursor, Zn-thiolate. As the reaction time progresses, the absorption increases in the ~370 nm and ~440 nm regions and the PL efficiency of the ~450 nm transition improves (based on normalization of observed PL counts to absorbance strength at the wavelength of excitation). The increase in absorbance implies that the number of optically active sites increases over time, while the simultaneous improvement of PL efficiency may arise from a combination of surface passivation and an increase in the number of optically active states. The bottom-most trace in FIG. 2, normalized to the ~440 nm absorbance transition, highlights the fairly small (~10 nm/60 meV) Stokes shift between the ~440 nm absorption band and the ~450 nm emission band, which is in contrast to the large Stokes shift of Cu—In—S NCs (ref 4). Furthermore, the PL peak does not shift during the course of growth, which suggests that DNCs are not quantum confined.

Figure 3A:
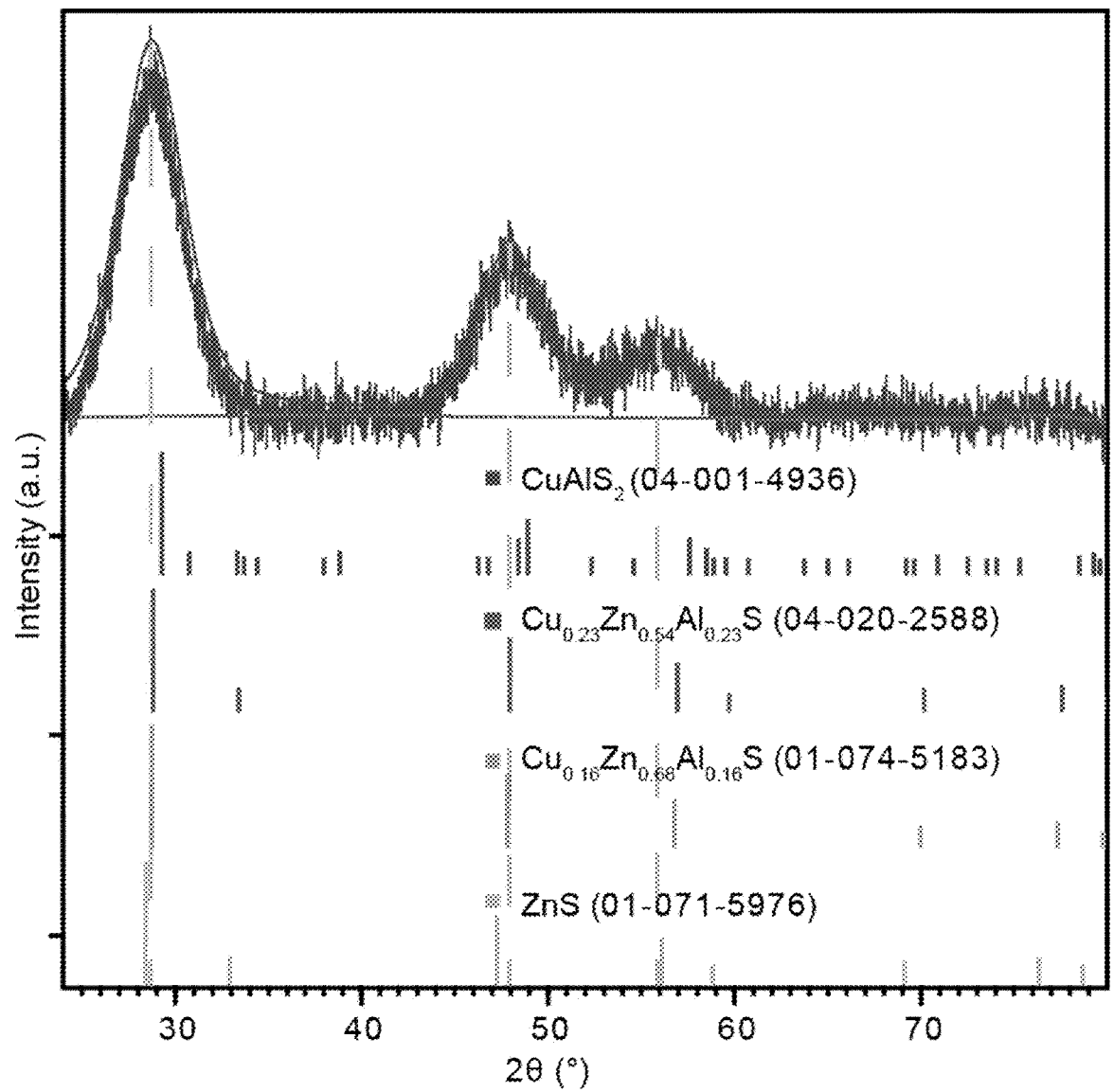
FIG. 3A depicts a powder X-Ray Diffraction pattern of DNCs compared with various literature diffraction patterns.
Figure 3B:
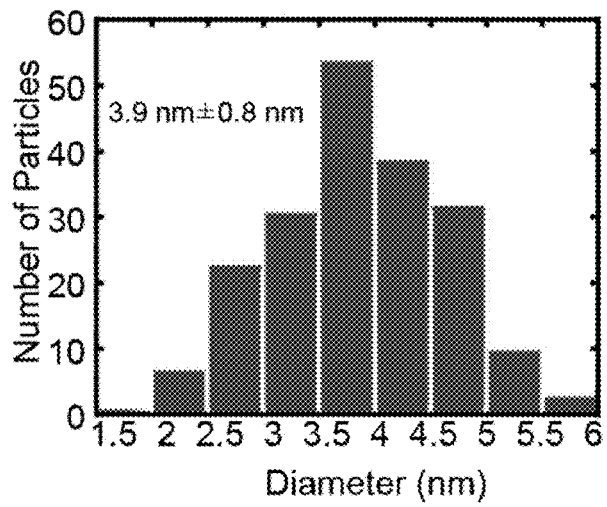
FIG. 3B depicts a histogram of DNC particle sizes as determined by TEM.
Figure 11B:
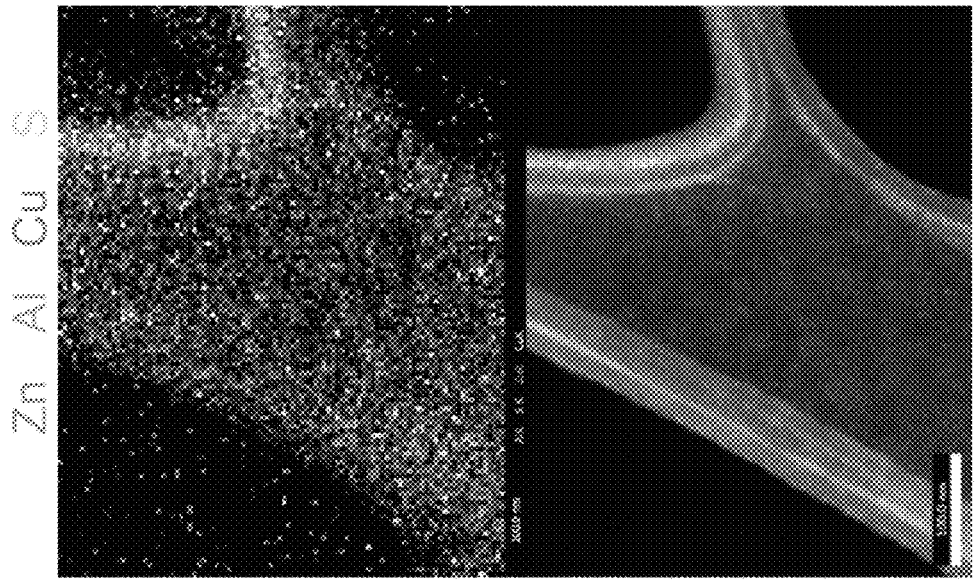
FIGS. 11A-11B depict a high-resolution TEM of DNCs after purification (FIG. 11A) and elemental mapping of a large section of a TEM grid containing DNCs (FIG. 11B), which are predominantly concentrated to the upper right section of the lacey carbon mesh.
Figure 11A:
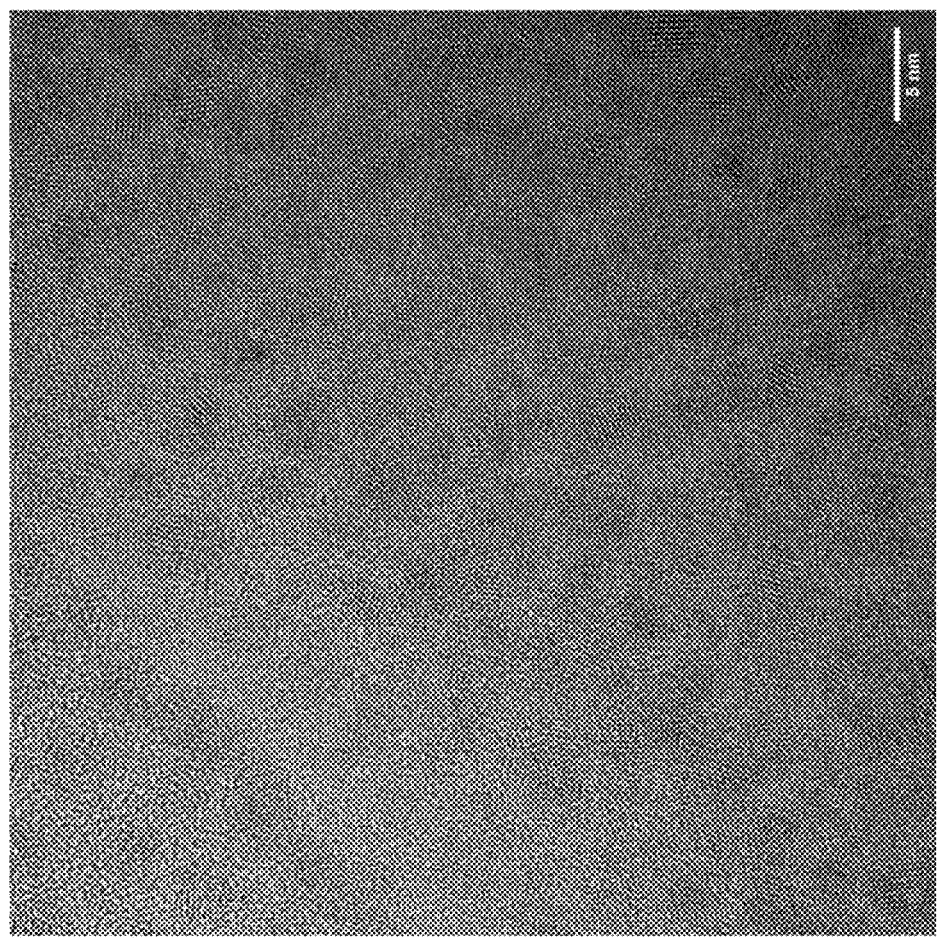

The chemical characterization above indicates that organic products/byproducts do not give rise to the observed optical properties, but materials characterization is necessary to show that DNCs are truly crystalline NCs rather than simple inorganic complexes. TEM and XRD indicate that DNCs are composed of crystalline NCs (FIGS. 3A-3C and 11A). XRD reveals a zinc-blende/chalcopyrite crystal structure, as is expected for reported Cu—Al—S, ZnS, and alloyed phases (FIG. 3A). It is noted that there is not a perfect match to previously reported crystalline phases, indicating that DNCs are likely alloyed structures. From elemental analysis reported in FIG. 1B paired with FIG. 3A XRD analysis, DNCs appear to be dominantly composed of an alloyed Cu—Al—S/ZnS phase, which is expected for Cu—Al—S NCs with a thick ZnS/ZnS alloy over coating. FIG. 3B indicates DNCs have a moderately narrow size distribution, with a relative standard deviation of ~20%. It is noted that unlike quantum confined NCs, the size homogeneity of DNC particles is not expected to be crucial because quantum confinement is not observed, which implies that optical properties should be largely independent of particle size. Furthermore, spatially resolved elemental mapping highlights that the NCs observed by TEM are composed of the expected elements and the sample is unlikely to be composed of byproduct species (FIG. 11B). The aforementioned materials characterization provides confidence that DNCs are crystalline NCs and not inorganic complexes.

Figure 4A:
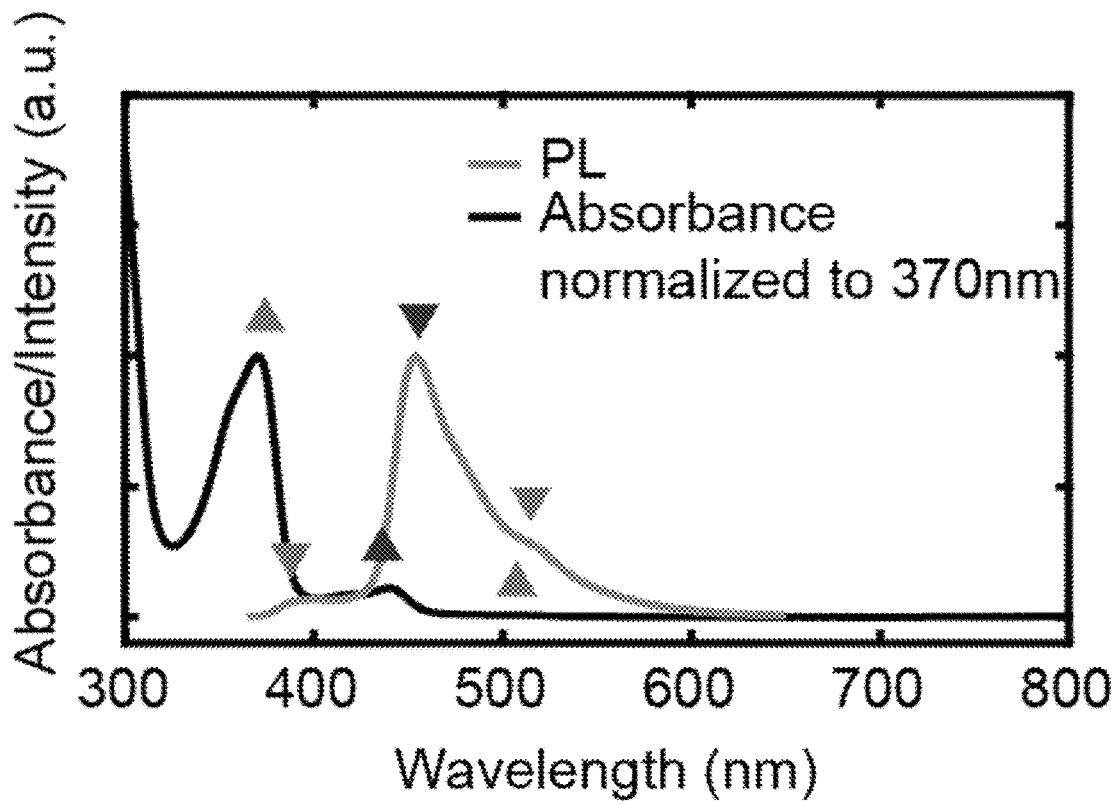
FIGS. 4A-4B show a summary of the ensemble optical properties of purified DNCs and a hypothesized energy level diagram.
Figure 4B:
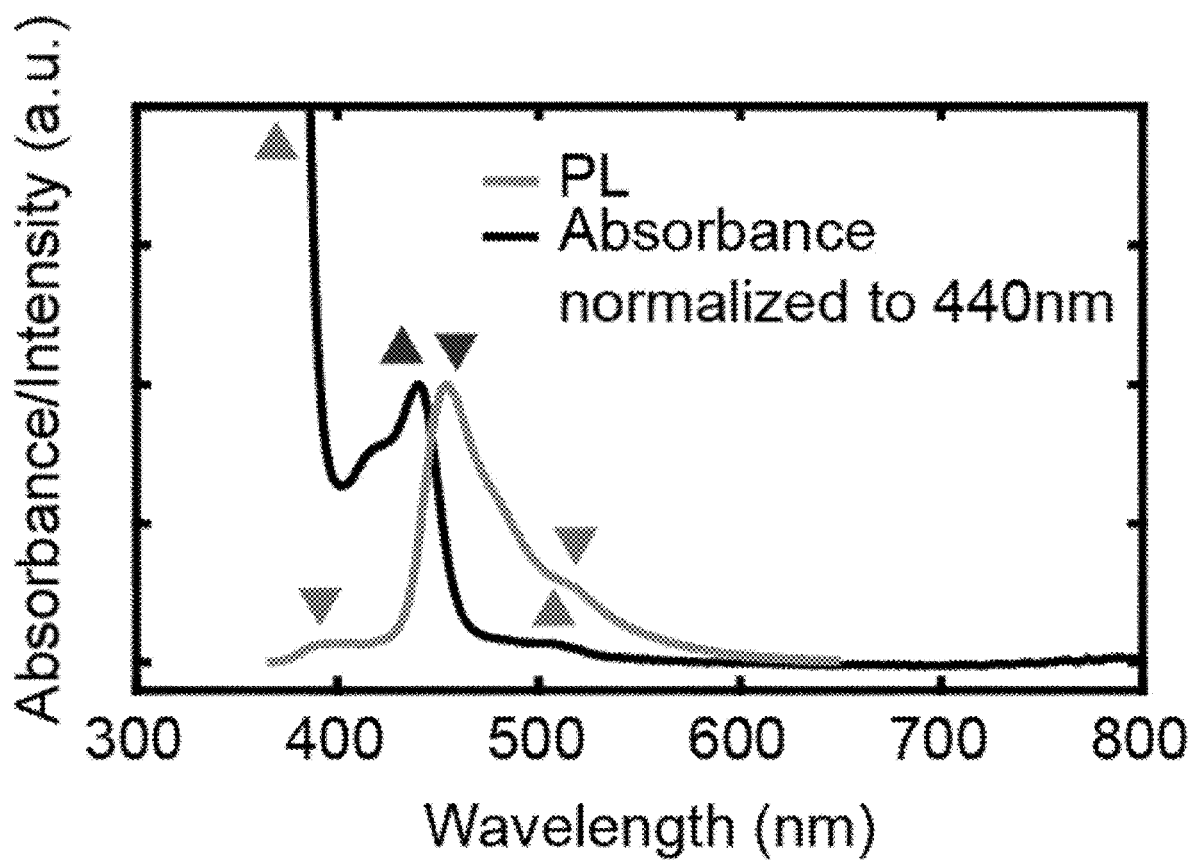
Figure 12A:
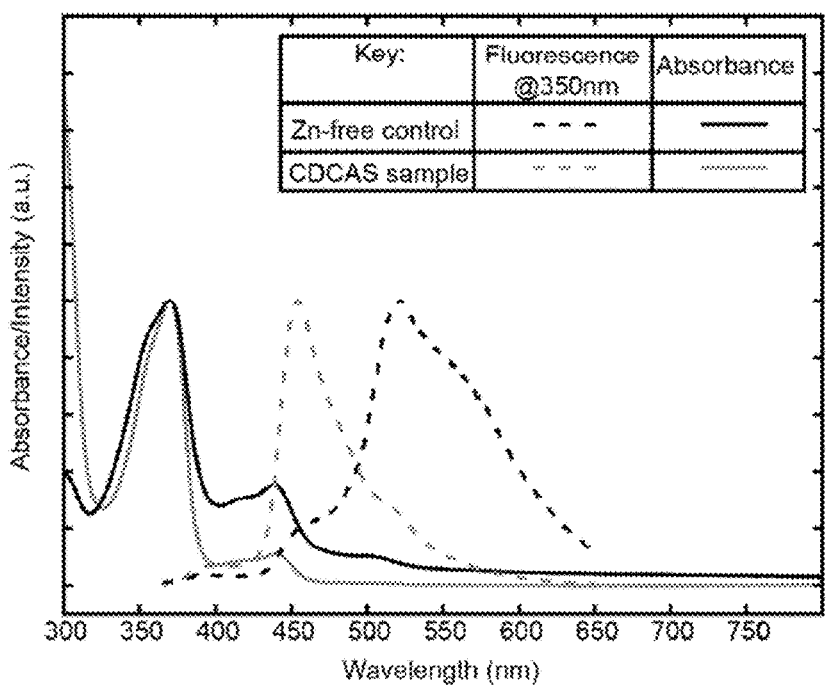
FIGS. 12A-12B depict a comparison of ensemble optical properties of DNCs to control samples prepared analogously, except without the addition of Zinc thiolate.
Figure 12B:
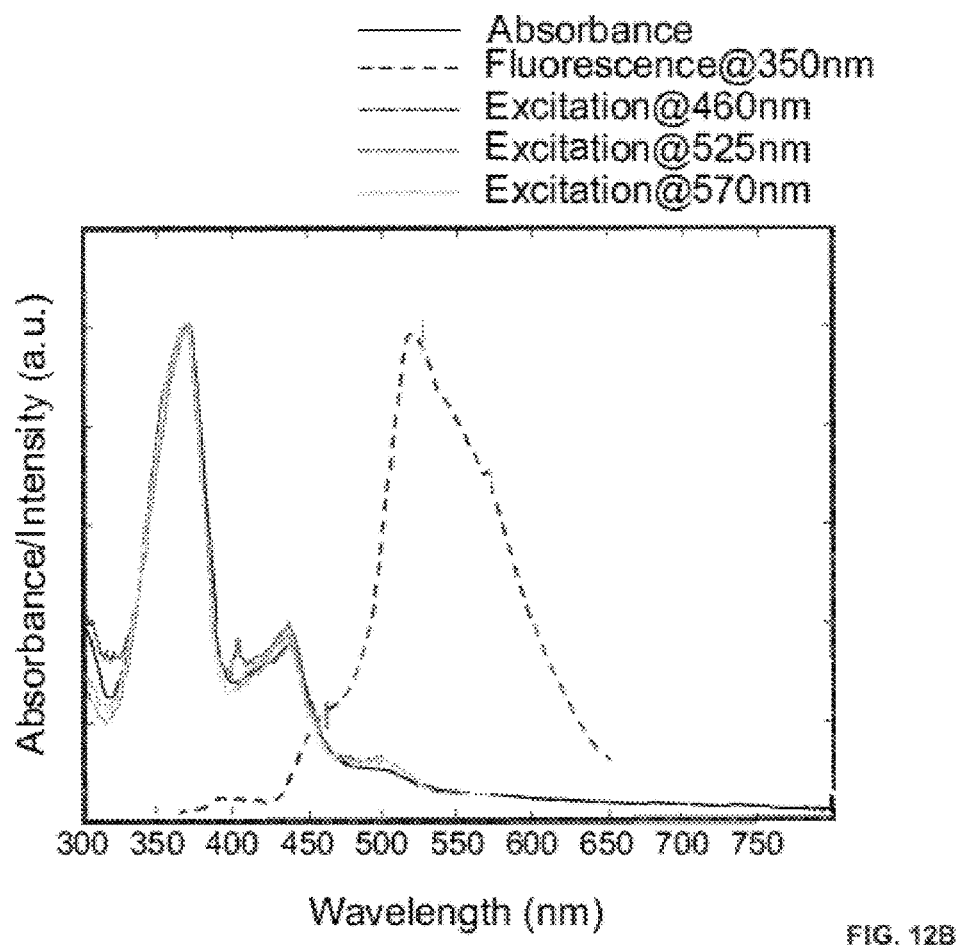

The three PL transitions observed in DNCs (FIGS. 4A-4C) can be explained by a model with 4 energy levels. These three different transitions are consistently observed across different batches of DNC samples. To provide insight into the origin of observed transitions, Zn-free control syntheses were performed, which revealed that the use of Zn makes the 440 nm/450 nm transition the most dominant transition (FIGS. 12A-12B). However, the presence of identical absorbance transitions in the Zn-free control indicates that Zn cannot be directly responsible for the observed optical transitions. While the Zn-free analog has a notably different PL lineshape, 1D fluorescence excitation scans show that all parts of the fluorescence spectrum arise from the same states as observed for Zn-containing DNCs (FIG. 12B). Ultimately, the control experiment provides compelling evidence for a model with four energy levels to explain the optical characteristics of DNCs.

Beyond ensemble absorbance/fluorescence characterization, a battery of spectroscopic and computational investigations to better understand DNCs were performed.

Figure 4C:
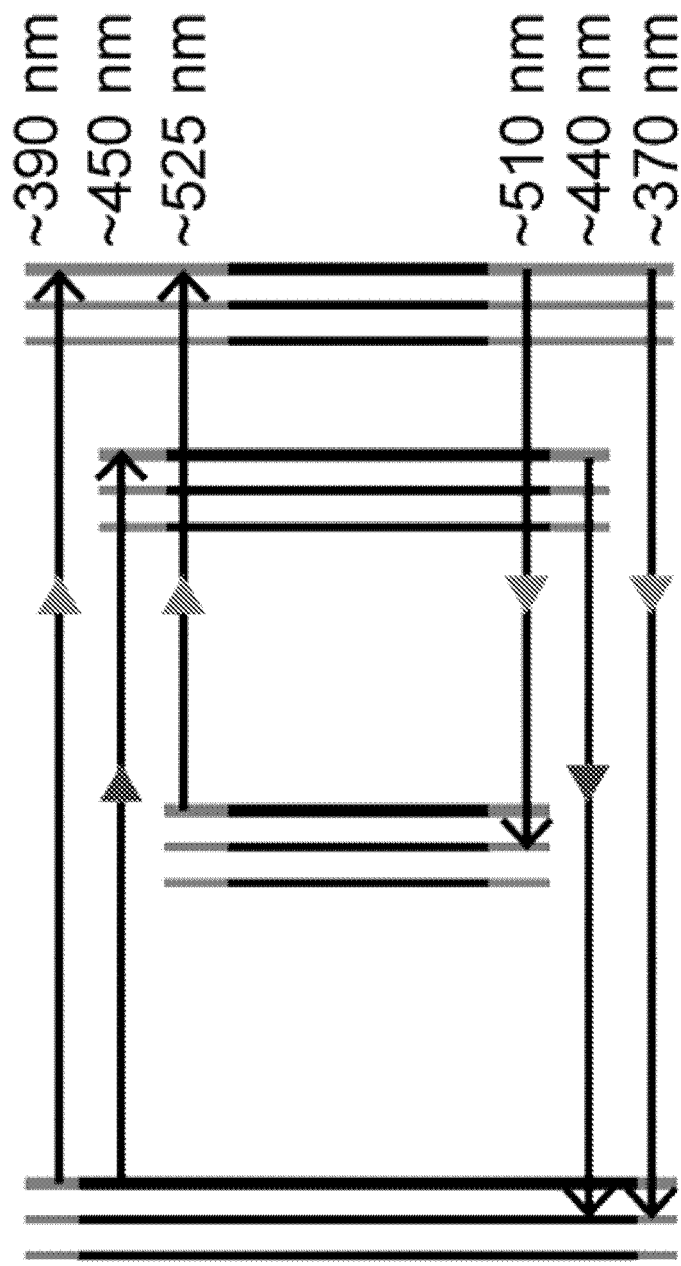
FIG. 4C shows a hypothesized energy level diagram highlighting the four electronic levels responsible for observed optical transitions.
Figure 5A:
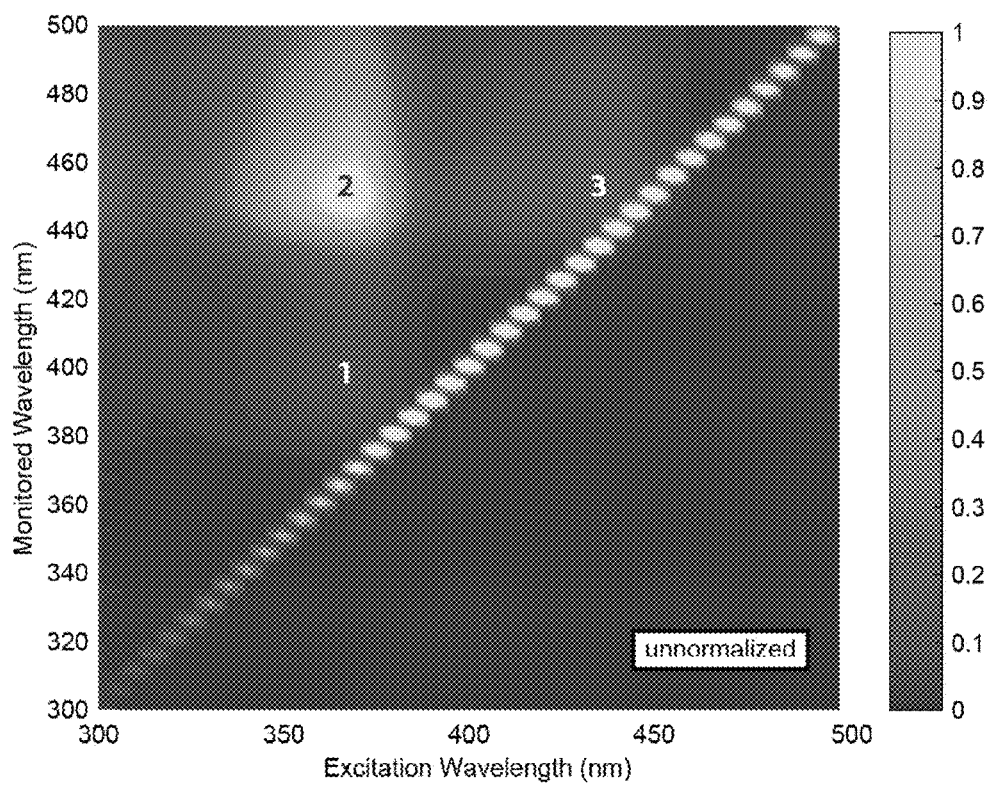
FIGS. 5A-5B show a two-dimensional fluorescence excitation scan without normalization across different excitation wavelength scans (FIG. 5A) and normalization of FIG. 5A to the maximum PL peak for each individual PL scan for a specific excitation wavelength (FIG. 5B).
Figure 5B:
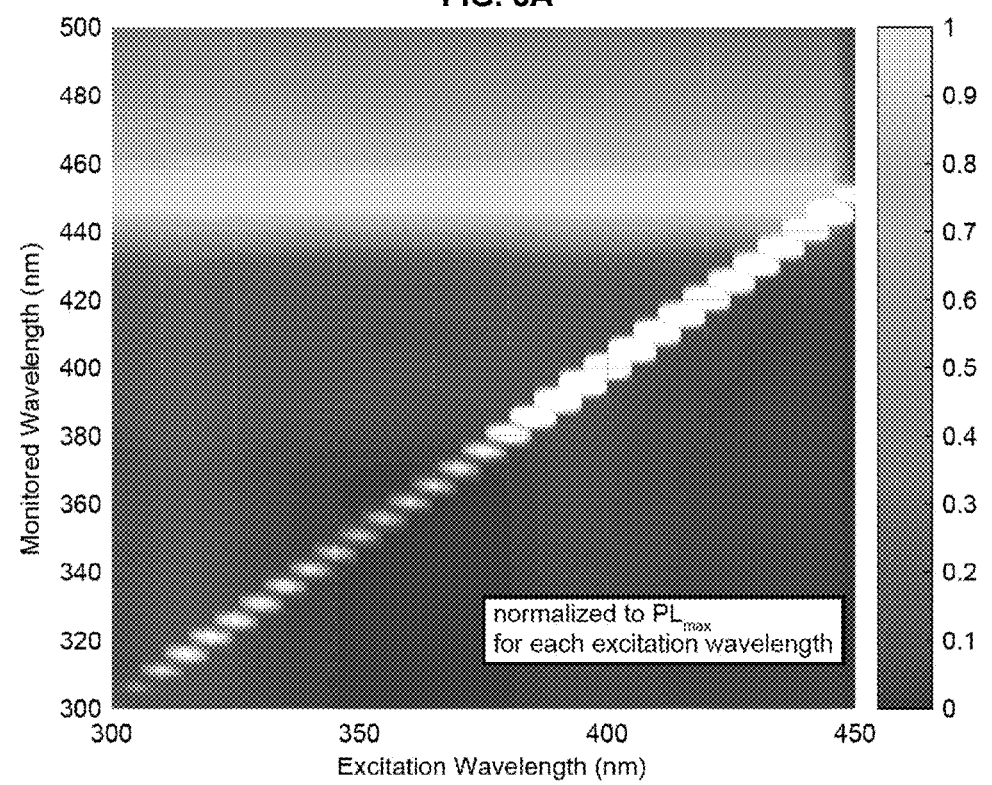

Two-dimensional fluorescence excitation spectroscopy allows for assignment of absorbance and fluorescence pathways between multiple electronic states, which is presented in FIGS. 5A-5B with three regions labeled numerically. "1" and "3" in FIG. 5A correspond with the direct absorbance/emission for the 370 nm/390 nm 440 nm/450 nm transitions, respectively (as depicted in FIG. 4C). "2" in FIG. 5A corresponds with efficient emission through the 450 nm transition after excitation into the strongly absorbing 370 nm transition, which indicates the ability for cross-talk between these states. Normalization of the two-dimensional fluorescence excitation spectroscopy data definitively shows that excitation of DNCs at any wavelength is funneled efficiently to the ~450 nm transition. This data suggests that efficient thermalization between well-defined states is responsible for the observed optical behavior of DNCs.

Figure 6A:
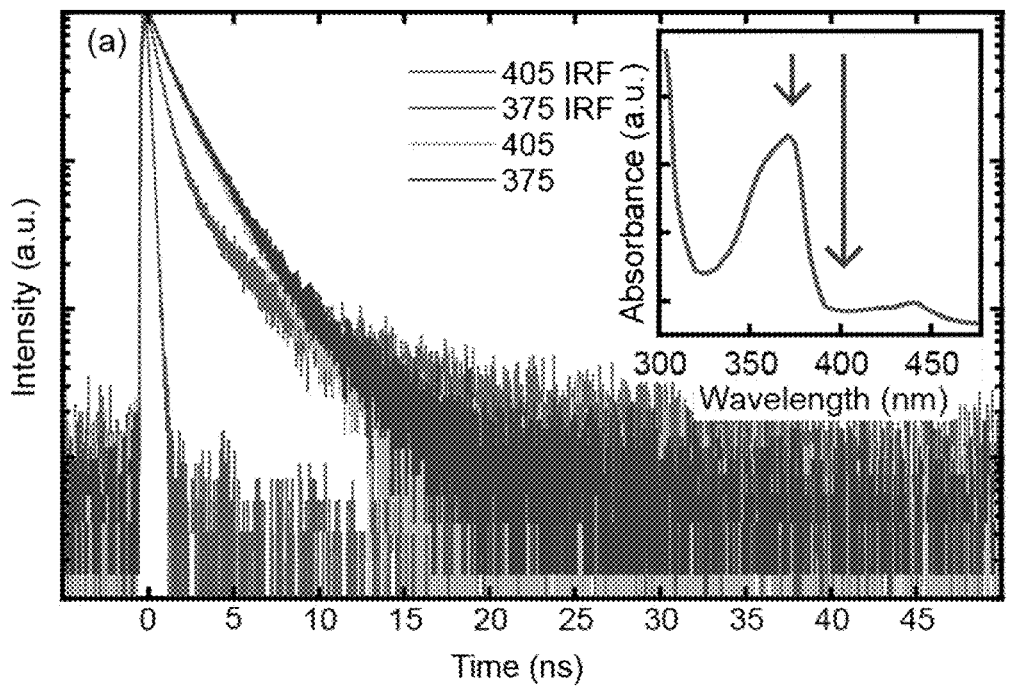
FIG. 6A depicts excitation wavelength dependent PL lifetimes where 375 nm excitation is absorbed by the ~370 nm absorbance feature while 405 nm excitation is absorbed by the blue tail of the ~440 nm absorbance feature.
Figure 6B:
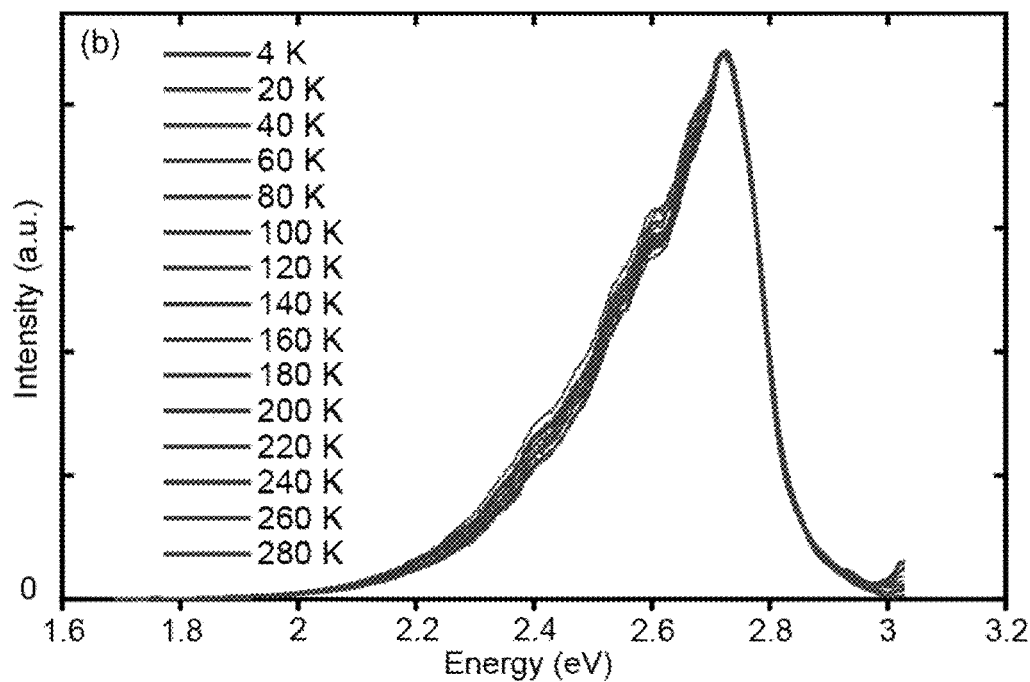
FIG. 6B depicts temperature dependent ensemble PL with 405 nm excitation.
Figure 6C:
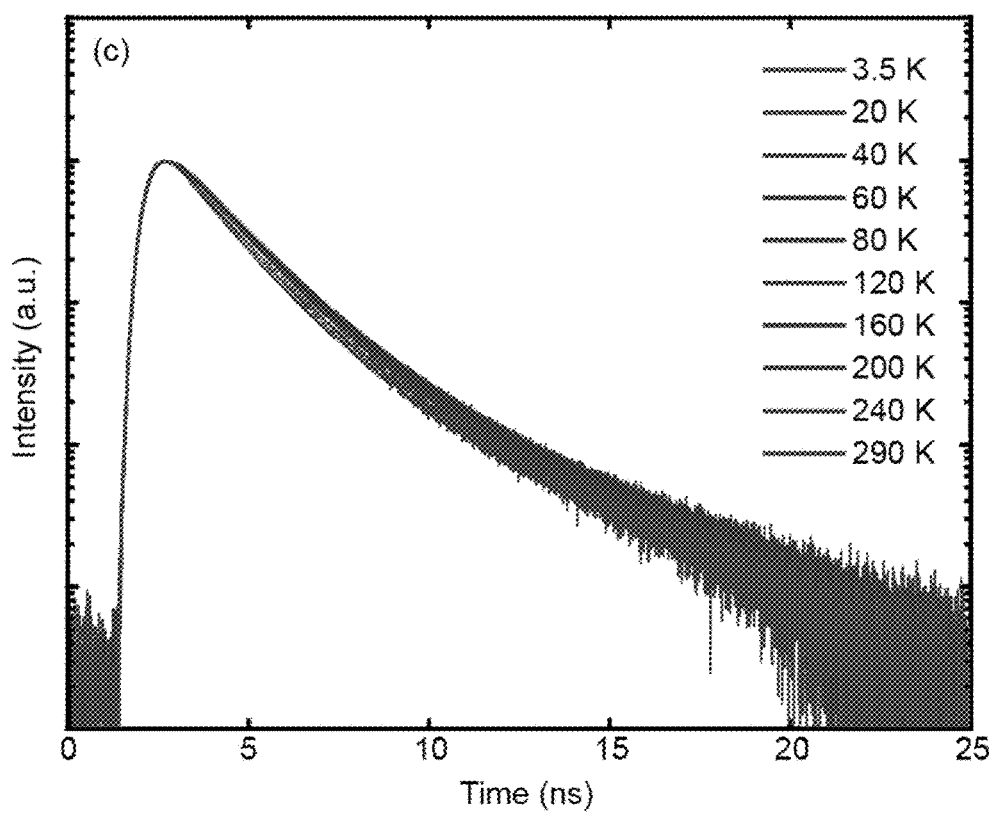
FIG. 6C depicts temperature dependent PL lifetimes with 405 nm excitation.
Figure 6D:
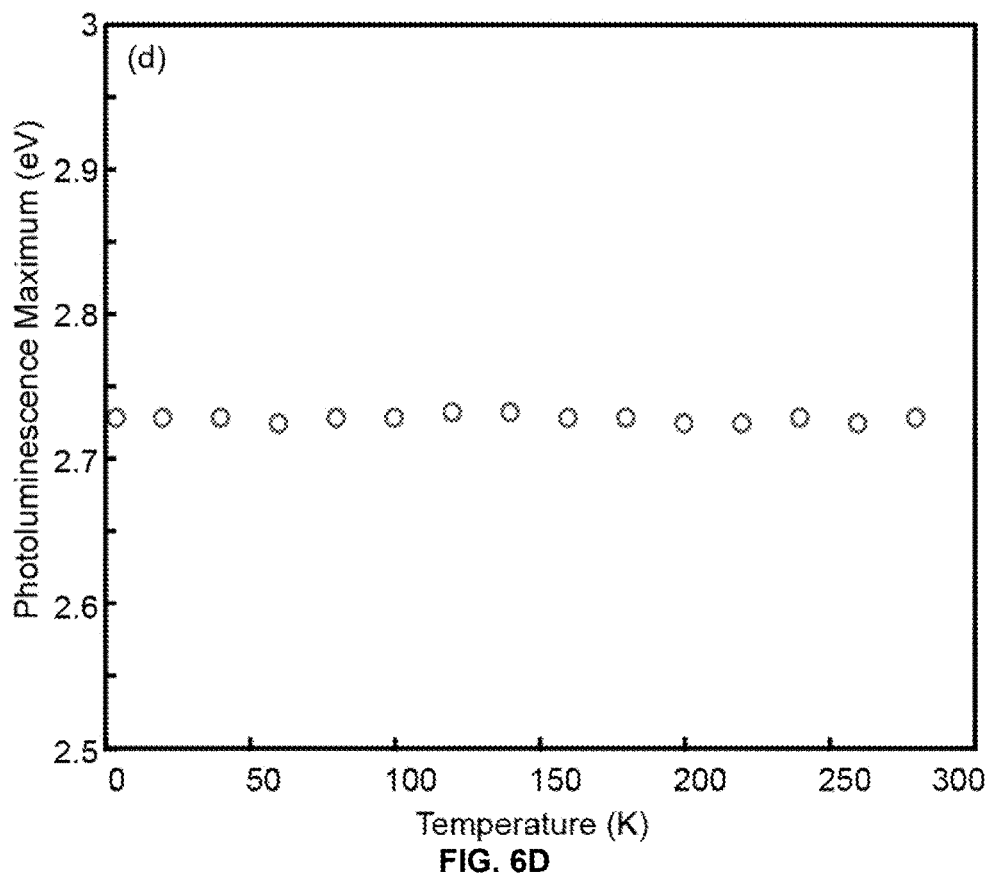
FIG. 6D depicts PL maximum of temperature-dependent ensemble PL in FIG. 6B. IRF=Instrument Response Function.

PL arising from defects display drastically different PL dynamics depending on the type of defect. For instance, many optical properties are temperature-dependent because of the role of thermally-promoted populations. Donor-acceptor recombination is one of the most common PL mechanisms of dopant-containing semiconductors, which yields broad PL with long PL lifetimes. Wavelength-dependent PL lifetimes and temperature dependent optical characterization aid in identifying the nature of PL mechanisms, and in turn, the nature of the defects (FIGS. 6A-6D). A fast PL lifetime was observed, which is consistent with the strong absorption band observed for the ~450 nm PL (FIGS. 4A-4C and 6A-6D). Furthermore, excitation into the ~370 nm absorbance band or directly into the defect states yield similar fast PL lifetimes (FIG. 6A). The PL lineshape is largely unaffected for temperatures between 4 K and 280 K (FIG. 6B). Such temperature-invariant behavior is indicative of highly localized electronic states, with weak coupling to low frequency phonon modes. The asymmetry of the PL lineshape is indicative of a large vibrational spacing, which further supports the presence of highly localized states. The PL maximum energy is effectively unchanged at all temperatures studied (FIG. 6D). Finally, the fast PL lifetime of DNCs is temperature-invariant (FIG. 6C), which has been reported for the transitions arising from highly localized states of NV centers in diamond (ref. 38). In total, there is almost no change in DNC optical behavior with temperature or the wavelength of excitation.

DFT calculations can allow for access to information regarding formation energy and expected transition energies. While optical and structural characterization suggest the presence of highly crystalline DNCs with efficient radiative transitions arising from well-defined, highly localized electronic states, the nature of the defect states is difficult to directly elucidate from experiment. From previously-reported first-principle calculations, chalcopyrite semiconductors are known to exhibit high structural tolerance over a range of compositional stoichiometry to yield various stable ordered defect compounds (ODC) such as $CuX_5Y_8$, $CuX_3Y_5$, $Cu_2X_4Y_7$ and $Cu_3X_5Y_9$ (where X=In, Ga, Al; Y=S, Se) (refs. 39-41).

Figure 7A:
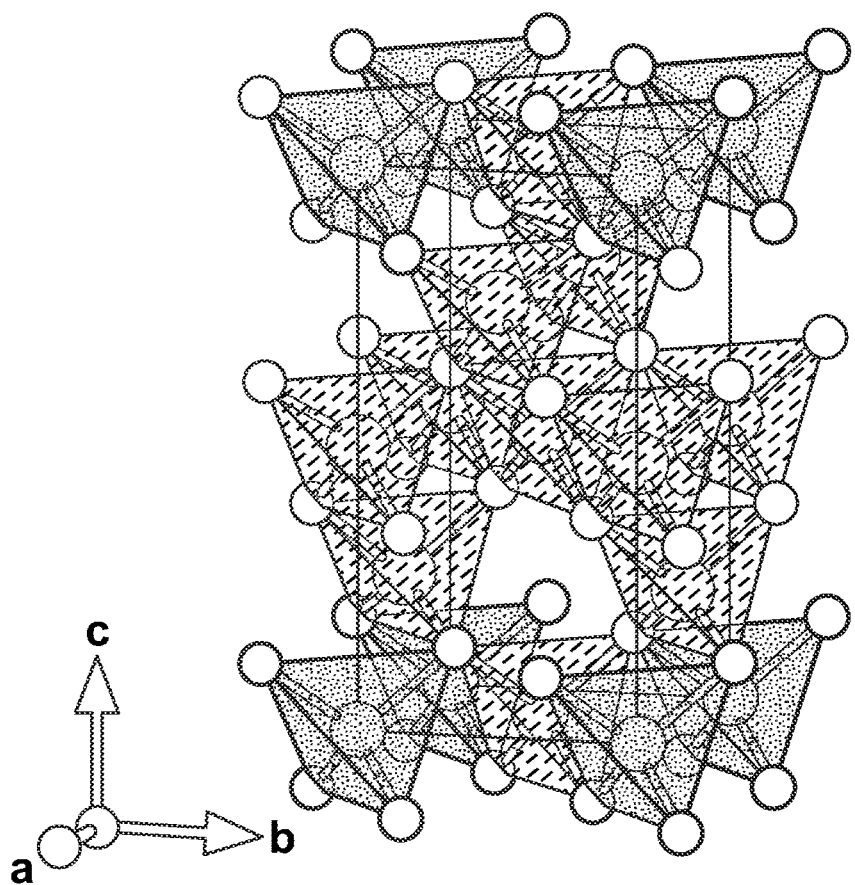
FIG. 7A depicts the conventional unit cell of $CuAl_5S_8$. The Copper, Aluminum, and Sulfur atoms are represented by dotted, dashed, and unfilled atoms respectively. The tetrahedron of Sulfur (unfilled) atoms near the metal atoms are shown.
Figure 7B:
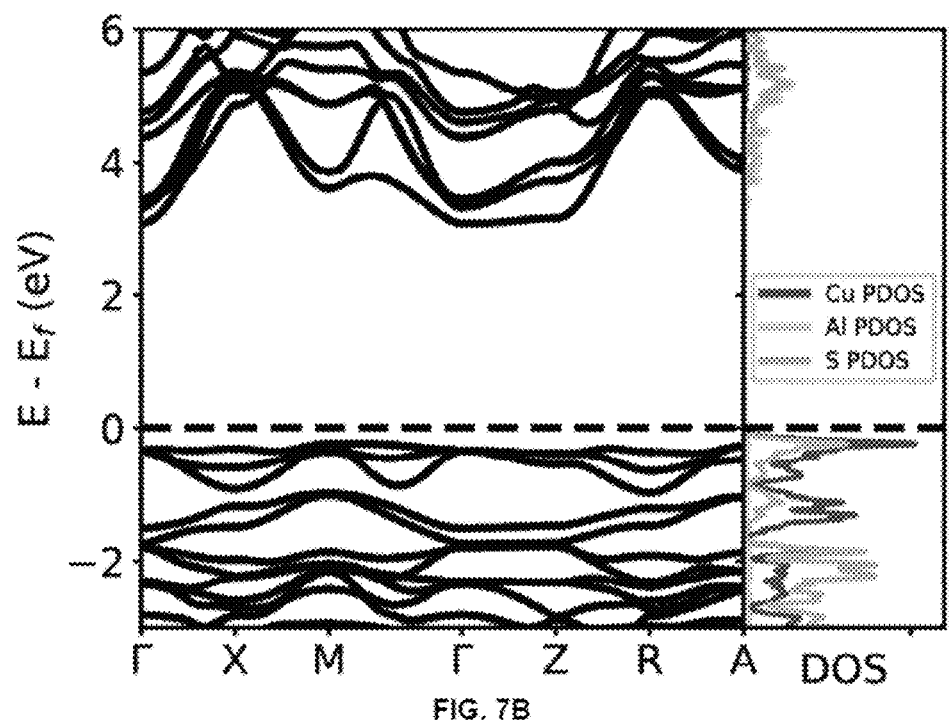
FIG. 7B depicts the band structure of $CuAl_5S_8$ along high symmetry lines in the Brillouin zone, and the partial DOS.

Based on experimentally determined elemental composition and XRD, the optically active component of DNCs is most similar to the ODC $CuAl_5S_8$, from which PL is suggested to arise from ordered defect centers. FIG. 7A presents a graphical representation of the ODC unit cell expected for $CuAl_5S_8$, which serves as the host lattice (ref 42). Furthermore, bulk calculations were used to approximate the transition energies rather than using an isolated crystallite since there is no quantum confinement observed experimentally. FIG. 7B shows the band structure of $CuAl_5S_8$ along high symmetry points in the Brillouin zone. $CuAl_5S_8$ has a direct bandgap of 3.32 eV at F point, with the valence bands near the Fermi level dominated by Cu(3d) orbitals and S(3p) orbitals and the conduction bands dominated by Al(3s) and (3p) orbitals. In these calculations, the total energies and bandgaps were determined by using the hybrid PBEO functional (ref. 43), which in general has been shown to yield values for bandgaps that are in close agreement with experiment.

Figure 7C:
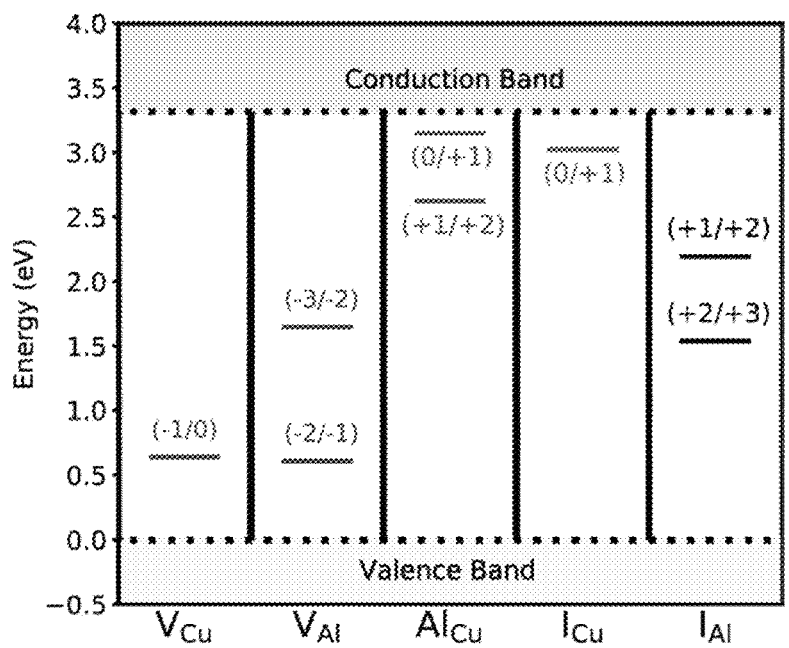
FIG. 7C depicts calculated thermodynamic transition energies of various defects, with the corresponding charge states for these transitions given in parentheses. Only defect transitions within the bandgap are shown; the relative formation energies between different sites of the same defect were tested to differ by no more than 20 meV.
Figure 13A:
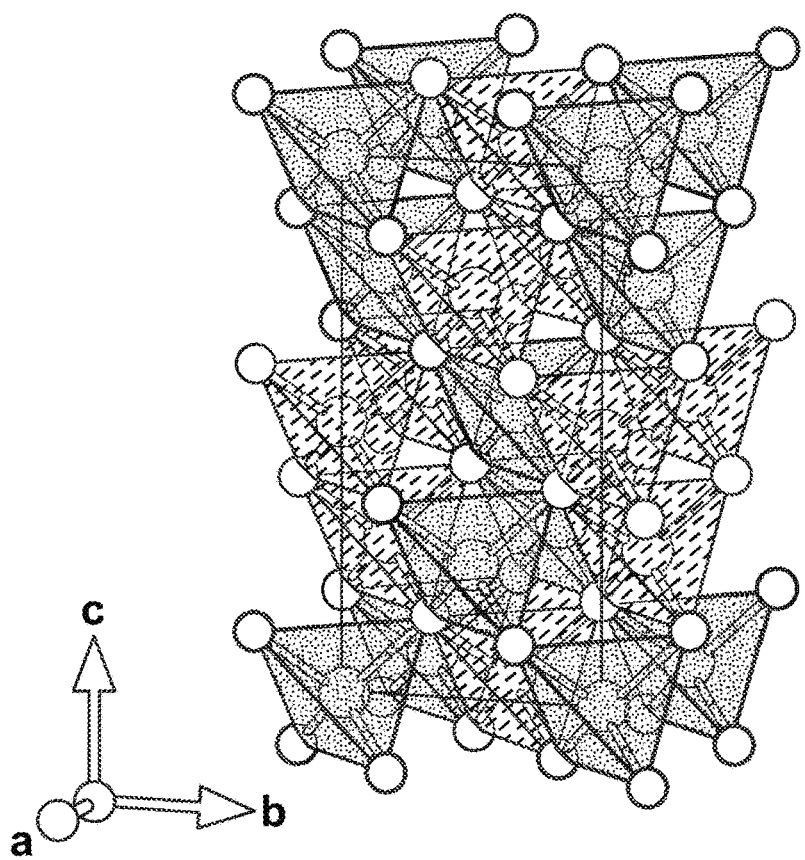
FIG. 13A depicts the conventional unit cell of $CuAlS_2$. The Copper, Aluminum and Sulphur atoms are represented by dotted, dashed, and unfilled atoms respectively. The tetrahedron of sulfur atoms near the metal atoms are shown.
Figure 13B:
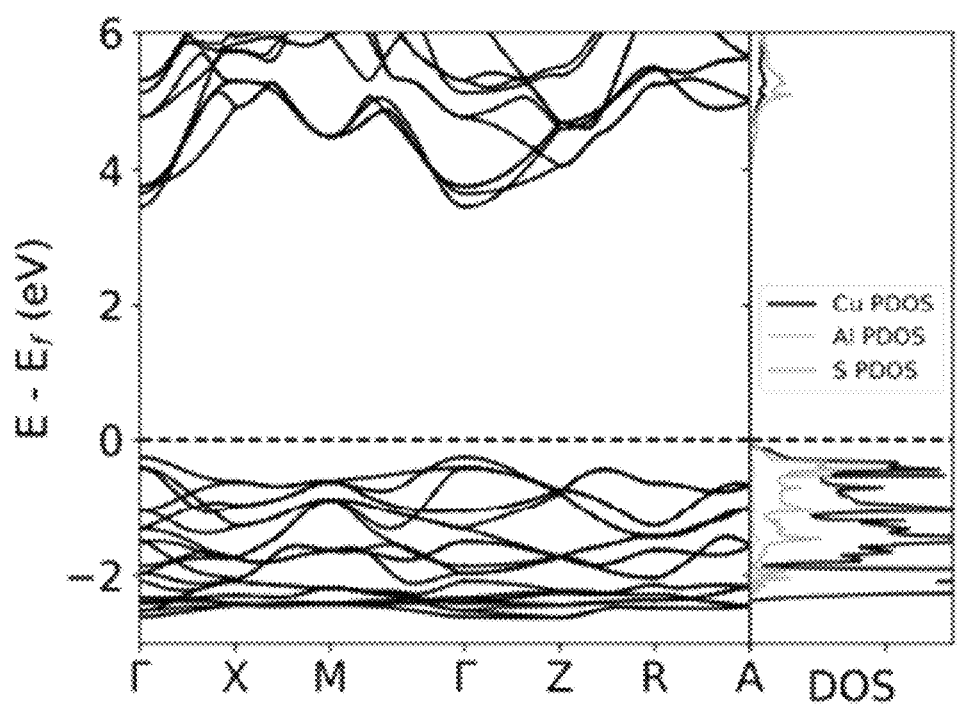
FIG. 13B depicts the bandstructure of $CuAlS_2$ along high symmetry lines in the Brillouin zone, and the partial DOS.
Figure 13C:
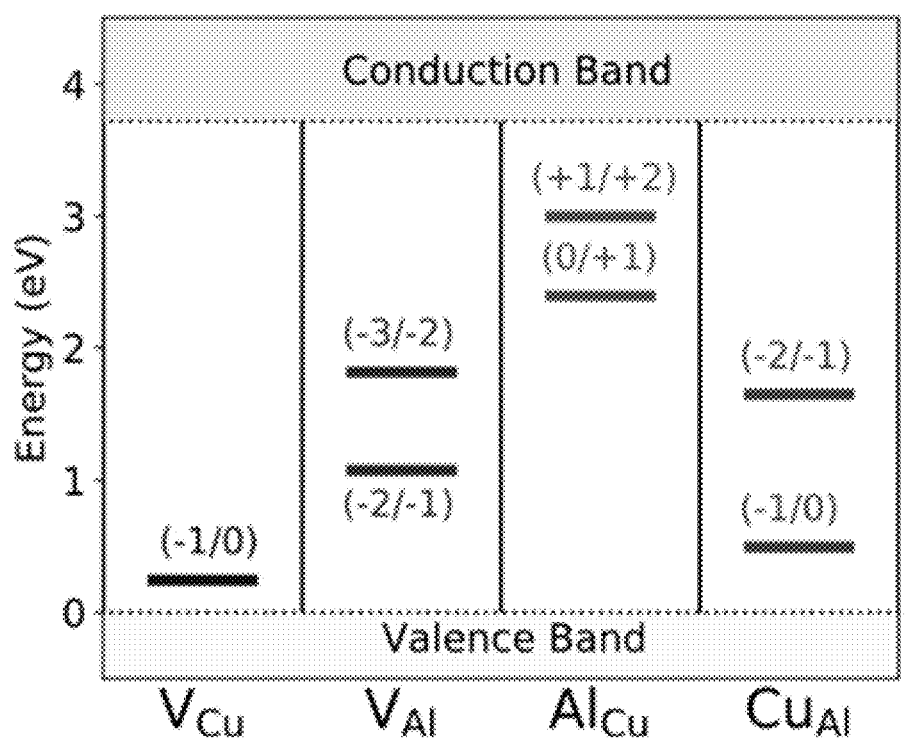
FIG. 13C depicts calculated thermodynamic transition energies of various defects, with the corresponding charge states for these transitions given in parentheses. Only defect transitions within the bandgap are shown.
Figure 14:
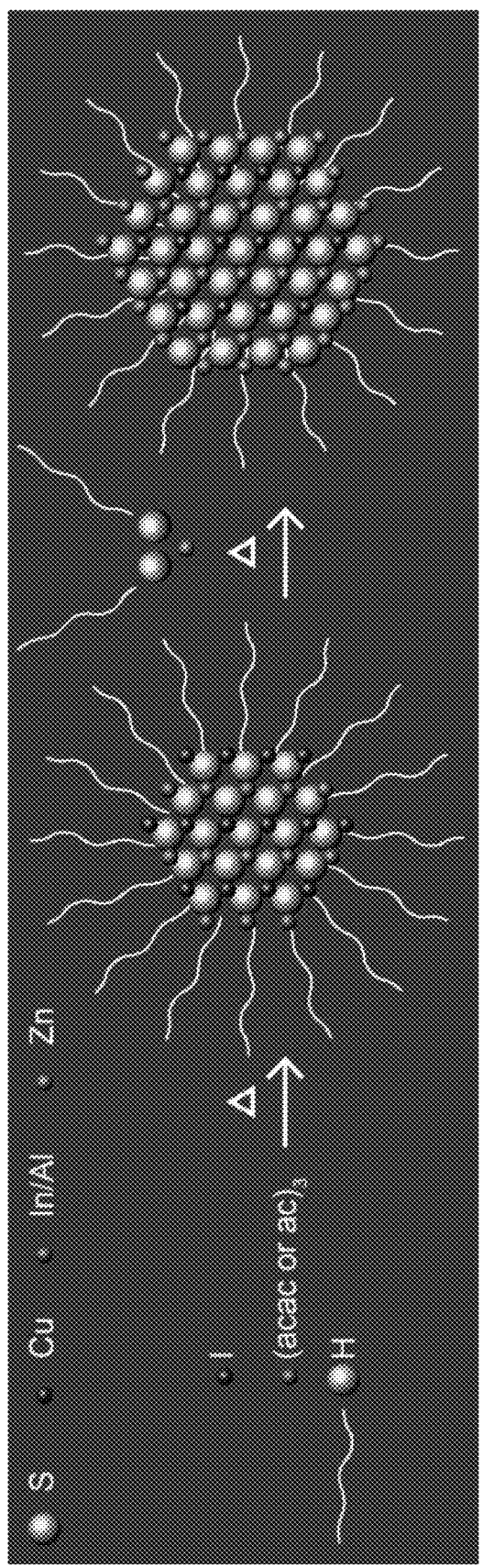
FIG. 14 depicts examples of precursor chemistry for the materials described herein.
Figure 15:
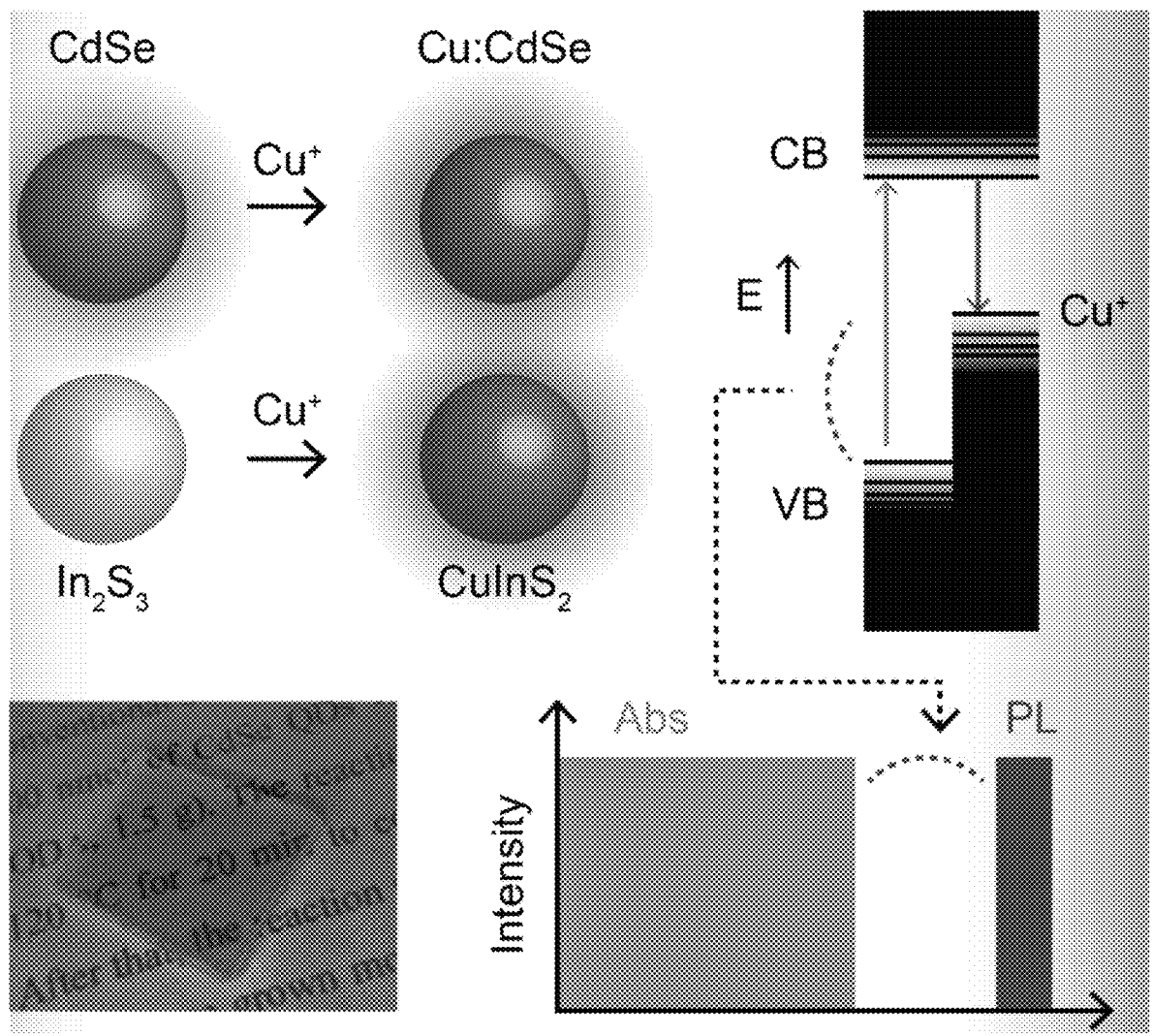
FIG. 15 shows copper-induced stokes shift in materials described herein.

Calculation of the thermodynamic defect transition levels for various point defects supplements difficult material characterization by identifying phases that could not give rise to the observed optical properties. As a result, there are three considerations: $CuAlS_2$, $CuAl_5S$, and ZnS-associated alloys. The notion of Zn-related species being the source of optical properties was discounted, as control experiments revealed Zn-free DNCs to have the same optically-active states (FIGS. 12A-12B). Furthermore, although calculations of the Cu-stoichiometric phase, $CuAlS_2$ could support the experimental optical data (FIGS. 13A-13C), they do not match the experimentally determined elemental composition. Point defects with transition energies lying within the bandgap of $CuAl_5S_8$ are shown in FIG. 7C, which provide a variety of possibilities for the sources of observed PL transitions.

Figure 7D:
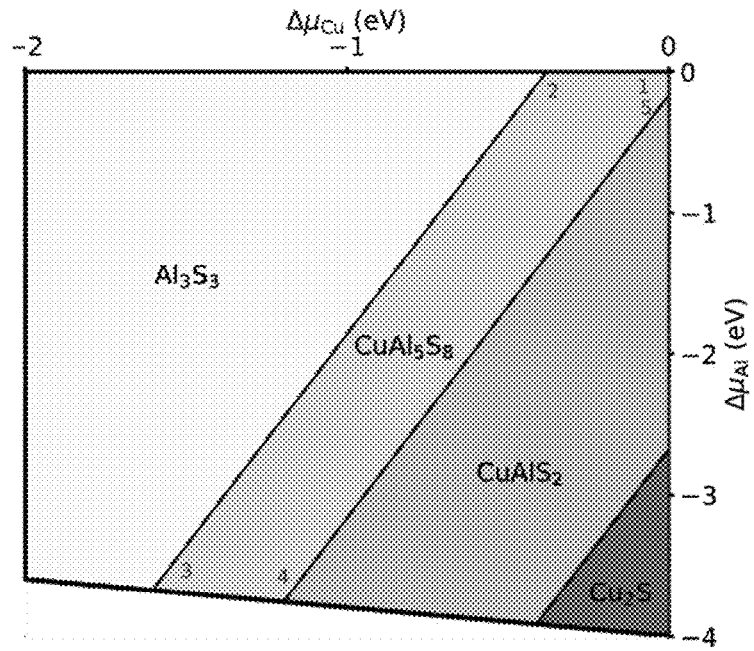
FIG. 7D depicts the calculated stability region of the Cu—Al—S systems in the $\Delta\mu_{Cu}$ and $\Delta\mu_{Al}$ plane.
Figure 7E:
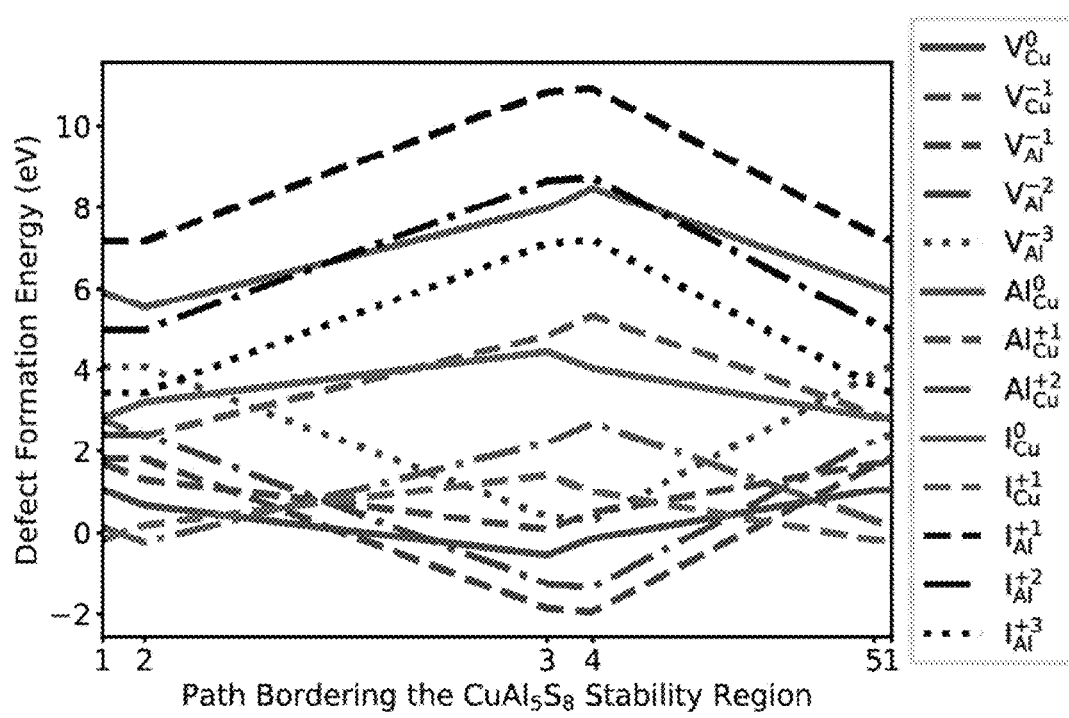
FIG. 7E depicts formation energies of all defects shown in FIG. 7C with the Fermi energy $E_F$ at the VBM, along the path bordering the $CuAl_5S_8$ stability region specified in FIG. 7D.

Assessing the thermodynamic stability of point defects provides credence that defects with calculated transition energies matching experiment might be reasonably expected to form. Such thermodynamic stability analysis of the defects is summarized in FIGS. 7D and 7E. FIG. 7D shows the boundary of stability of $CuAl_5S_8$ against competing phases of $Cu_2S$ (ref. 44), $CuAlS_2$ (ref. 45), and $Al_2S_3$ (ref. 46),[46] as well as the elemental solid of Cu and Al. The Fermi energy $E_F$ was set at the VBM since defective $CuAlS_2$ is known to be intrinsically p-type semiconductor (ref. 47). By calculating the thermodynamic stability of various possible defects (FIG. 7E), $Al_{Cu}$, $V_{Cu}$, $V_{Al}$, and $I_{Cu}$ were found to be the most likely defects in the Al-rich, Cu-deficient synthetic conditions, represented in FIG. 7D as the phase between points 1, 2 and 3. With knowledge of the thermodynamic stability and the transition energies for these defects, it was hypothesized these four defects to be responsible for the observed optical properties as detailed below.

Figure 3C:
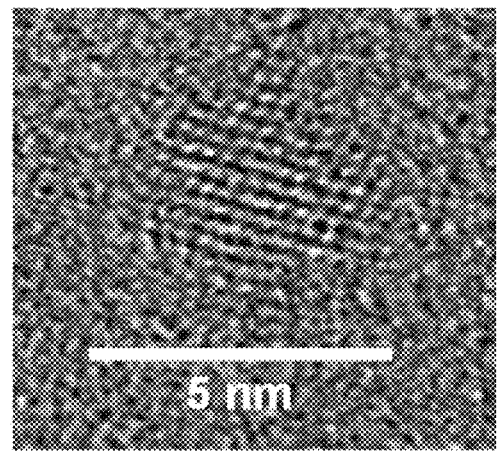
FIG. 3C depicts a high-resolution TEM of a DNC.

DNCs are believed to be $CuAl_5S_8$ NCs with ZnS/ZnS-alloyed shells. In the early parts of this section, the simple notions of organic and inorganic byproducts to explain optical properties were first discounted. TEM and XRD further revealed the crystallinity of our particles (FIGS. 3A-3C). Two-dimensional fluorescence excitation spectroscopy showed that DNC optical properties arise from a single optically-active source rather than an ensemble of different emitters (FIGS. 5A-5B). In FIG. 5A, there are three dominant areas displaying significant signal intensity labeled (1)-(3). Transitions (1) and (3) are assigned to a high and low energy defect-related state, while transition (2) is assigned to excitation into the highest energy level (via ~370 nm excitation) followed by radiative recombination (via ~450 nm emission) to the defect-related second lowest energy level. Ultimately, optical properties can be explained by using four energy levels, as presented in FIG. 4C. DFT calculations indicate that the dominant ~450 nm transition likely arises from a defect cluster, likely to be $I_{Cu}$ or $Al_{Cu}$ paired with $V_{Cu}$ or $V_{AL}$. The ~390 nm transition is consistent with a transition between $I_{Cu}(0/+1)$ or $Al_{Cu}(0/+1)$ and the valence band. The ~525 nm transition is likely surface-related, which is further supported by its suppression in comparison to the Zn-free control experiment of DNCs (FIGS. 12A-12B).

In conclusion, a simple, low-temperature, solution-phase synthesis is described to prepare blue light emitting DNCs (~20% QY) based on the non-toxic, Earth-abundant elements Cu, Al, Zn, and S. Chemical and materials characterization is reported to provide support that the observed optical properties arise from DNCs, rather than organic or inorganic byproducts. Through spectroscopic and computational studies, it was additionally hypothesized that the primary observed emission band arises from highly localized states, which are hypothesized to consist of a defect cluster. Most notably, optical properties are entirely different from Cu—In—S NCs, despite similarities between optically-active defects. This result is likely due to the large band gap of Cu—Al—S, which enables defect-defect transitions rather than transitions between defects and the valence/conduction band.

Beyond comparisons to other Cu-based ternary chalcogenide NCs, the DNCs expand the library of colloidal NCs capable of 1. efficient blue light emission and 2. defect-mediated PL. The purposeful inclusion of crystalline defects to give rise to efficient PL by compositional tuning represents a fundamental progression from previous NC synthetic efforts, which had largely focused on the synthesis of defect-free NCs. It is believed that the general method described here may produce other types of DNCs with unique optical properties.

Experimental Section

Synthesis of DNCs: Briefly, a 50 mL three-neck round bottom flask was charged with 0.125 mmol of CuI, 1 mmol of Al(acac)$_3$, and 5 mL 1-dodecanethiol and then degassed at 100° C. under Schlenk line vacuum for 1 hour while vigorously stirring. This mixture was then rapidly heated (<5 minutes) and kept at 180° C. while under a nitrogen environment for 90 minutes. The reaction mixture was then cooled to 100° C. before adding 4 mmol of Zn thiolate (preparation described in the Supporting Information) and then heated to 240° C. under a nitrogen environment. After 210 minutes at 240° C., the reaction was cooled to room temperature. The reaction mixture was then diluted in hexanes and precipitated with methanol or dimethylformamide.

All DFT calculations were performed using the Vienna Ab Initio Simulation Package (VASP, v5.4) (refs. 48, 49). The core-valence interaction was treated by projector-augmented wave (PAW) method (ref. 50), and the Perdew-Burke-Ernzerhof (PBE) approximation to the exchange correlation functional (ref. 51) was used to relax the atomic positions. The scheme proposed by Freysoldt et. al. as implemented in the SXDEFECTALIGN code (refs. 52, 53) was used to evaluate the correction to defect formation energies.

Additional details of the characterization and DFT calculations are provided below.

The following references are incorporated by reference in their entirety.

[1] R. Xie, M. Rutherford, X. Peng, *J. Am. Chem. Soc.* 2009, 131, 5691-5697.
[2] P. M. Allen, M. G. Bawendi, *J. Am. Chem. Soc.* 2008, 130, 9240-9241.
[3] S. L. Castro, S. G. Bailey, R. P. Raffaelle, K. K. Banger, A. F. Hepp, *Chem. Mater.* 2003, 15, 3142-3147.
[4] L. Li, A. Pandey, D. J. Werder, B. P. Khanal, M. Pietryga, V. I. Klimov, *J. Am. Chem. Soc.* 2011, 133, 1176-1179.
[5] A. M. Malik, P. O'Brien, N. Revaprasadu, *Adv. Mater.* 1999, 11, 1441-1444.
[6] Y. Han, S. He, X. Luo, Y. Li, Z. Chen, W. Kang, X. Wang, K. Wu, *J. Am. Chem. Soc.* 2019, 141, 13033-13037.
[7] M. Wu, D. N. Congreve, M. W. B. Wilson, J. Jean, N. Geva, M. Welborn, T. Van Voorhis, V. Bulovic, M. G. Bawendi, M. A. Baldo, *Nat. Photonics* 2016, 10, 31-34.
[8] V. I. Klimov, T. A. Baker, J. Lim, K. A. Velizhanin, H. McDaniel, *ACS Photonics* 2016, 3, 1138-1148.
[9] M. R. Bergren, N. S. Makarov, K. Ramasamy, A. Jackson, R. Guglielmetti, H. McDaniel, *ACS Energy Lett.* 2018, 520-525.
[10] F. Meinardi, H. McDaniel, F. Carulli, A. Colombo, K. A. Velizhanin, N. S. Makarov, R. Simonutti, V. I. Klimov, S. Brovelli, *Nat. Nanotechnol.* 2015, 10, 878-885.
[11] K. E. Knowles, T. B. Kilburn, D. G. Alzate, S. McDowall, D. R. Gamelin, *Chem. Commun.* 2015, 51, 9129-9132.
[12] C. H. M. Chuang, P. R. Brown, V. Bulović, M. G. Bawendi, *Nat. Mater.* 2014, 13, 796-801.
[13] M. G. Panthani, V. Akhavan, B. Goodfellow, J. P. Schmidtke, L. Dunn, A. Dodabalapur, P. F. Barbara, B. A. Korgel, *J. Am. Chem. Soc.* 2008, 130, 16770-16777.
[14] W. Song, H. Yang, *Chem. Mater.* 2012, 24, 1961-1967.
[15] J. M. Caruge, J. E. Halpert, V. Wood, V. Bulovic, M. G. Bawendi, *Nat. Photonics* 2008, 2, 247-250.
[16] O. T. Bruns, T. S. Bischof, D. K. Harris, D. Franke, Y. Shi, L. Riedemann, A. Bartelt, F. B. Jaworski, J. A. Carr, C. J. Rowlands, et al., *Nat. Biomed. Eng.* 2017, 1, 1-11.
[17] D. Deng, Y. Chen, J. Cao, J. Tian, Z. Qian, S. Achilefu, Y. Gu, *Chem. Mater.* 2012, 24, 3029-3037.
[18] E. C. Hansen, S. N. Bertram, J. J. Yoo, M. G. Bawendi, *Small* 2019, 15, 1901462.
[19] K. E. Knowles, K. H. Hartstein, T. B. Kilburn, A. Marchioro, H. D. Nelson, P. J. Whitham, D. R. Gamelin, *Chem. Rev.* 2016, 116, 10820-10851.
[20] R. Sumner, S. Eiselt, T. B. Kilburn, C. Erickson, B. Carlson, D. R. Gamelin, S. McDowall, D. L. Patrick, *J. Phys. Chem. C* 2017, 121, 3252-3260.
[21] K. E. Knowles, H. D. Nelson, T. B. Kilburn, D. R. Gamelin, *J Am. Chem. Soc.* 2015,137, 13138-13147.
[22] V. Pinchetti, Q. Di, M. Lorenzon, A. Camellini, M. Fasoli, M. Zavelani-Rossi, F. Meinardi, J. Zhang, S. A. Crooker, S. Brovelli, *Nat. Nanotechnol.* 2018, 13, 145-151.
[23] G. Counio, T. Gacoin, J. P. Boilot, Ä. Polytechnique, P. Cedex, *J. Phys. Chem. B* 1998, 102, 5257-5260.
[24] M. A. Chamarro, V. Voliotis, R. Grousson, P. Lavallard, T. Gacoin, G. Counio, J. P. Boilot, R. Cases, *J. Cryst. Growth* 1996, 159, 853-856.

[25] H. Zang, H. Li, N. S. Makarov, K. A. Velizhanin, K. Wu, Y. S. Park, V. I. Klimov, *Nano Lett.* 2017, 17, 1787-1795.
[26] D. J. Norris, A. L. Efros, S. C. Erwin, *Science.* 2008, 319, 1776-1780.
[27] H. D. Nelson, D. R. Gamelin, *J. Phys. Chem. C* 2018, 122, 18124-18133.
[28] P. J. Whitham, A. Marchioro, K. E. Knowles, T. B. Kilburn, P. J. Reid, D. R. Gamelin, *J. Phys. Chem. C* 2016, 120, 17136-17142.
[29] H. D. Nelson, X. Li, D. R. Gamelin, *J. Phys. Chem. C* 2016, 120, 5714-5723.
[30] D. H. Jara, K. G. Stamplecoskie, P. V. Kamat, *J. Phys. Chem. Lett.* 2016, 7, 1452-1459.
[31] W. D. Rice, H. Mcdaniel, V. I. Klimov, S. A. Crooker, *J. Phys. Chem. Lett.* 2014, 5, 4105-4109.
[32] A. S. Fuhr, H. J. Yun, N. S. Makarov, H. Li, H. McDaniel, V. I. Klimov, *ACS Photonics* 2017, 4, 2425-2435.
[33] V. Pinchetti, M. Lorenzon, H. McDaniel, R. Lorenzi, F. Meinardi, V. I. Klimov, S. Brovelli, *Nano Lett.* 2017, 17, 4508-4517.
[34] I. Aksenov, K. Sato, *Appl. Phys. Lett.* 1992, 61, 1063-1065.
[35] I. Aksenov, M. Matsui, T. Kai, K. Sato, *Jpn. J. Appl. Phys.* 1993, 32, 4542-4549.
[36] B. Bhattacharyya, T. Pandit, G. P. Rajasekar, A. Pandey, *J. Phys. Chem. Lett.* 2018, 9, 4451-4456.
[37] B. Bhattacharyya, A. K. Simlandy, A. Chakraborty, G. P. Rajasekar, N. B. Aetukuri, S. Mukherjee, A. Pandey, *ACS Energy Lett.* 2018, 3, 1508-1514.
[38] M. W. Doherty, N. B. Manson, P. Delaney, F. Jelezko, J. Wrachtrup, L. C. L. Hollenberg, *Phys. Rep.* 2013, 528, 1-45.
[39] J. Pohl, K. Albe, *J Appl. Phys.* 2010, 108, 1-5.
[40] C. L. Bailey, L. Liborio, G. Mallia, S. Tomić, N. M. Harrison, *Phys. Rev. B-Condens. Matter Mater. Phys.* 2010, 81, 1-8.
[41] L. M. Liborio, C. L. Bailey, G. Mallia, S. Tomić, N. M. Harrison, *J. Appl. Phys.* 2011, 109, 1-9.
[42] S. Zhang, S. H. Wei, A. Zunger, H. Katayama-Yoshida, *Phys. Rev. B-Condens. Matter Mater. Phys.* 1998, 57, 9642-9656.
[43] J. P. Perdew, M. Ernzerhof, K. Burke, *J Chem. Phys.* 1996, 105, 9982-9985.
[44] T. Barth, *Zentralblatt fuer Mineral. Geol. und Palaeontol.* 1926, 26, 284-286.
[45] H. Hahn, G. Frank, W. Klingler, A.-D Meyer, G. Storger, *ZAAC-J. Inorg. Gen. Chem.* 1953, 271, 153-170.
[46] H. Haeuseler, A. Cansiz, H. D. Lutz, *Z. Naturforsch* 1981, 36b, 532-534.
[47] D. Huang, R. Y. Tian, Y. J. Zhao, J. J. Nie, X. H. Cai, C. M. Yao, *J. Phys. D. Appl. Phys.* 2010, 43, 395405.
[48] G. Kresse, J. Furthmüller, *Comput. Mater. Sci.* 1996, 6, 15-50.
[49] G. Kresse, J. Furthmüller, *Phys. Rev. B* 1996, 54, 11169-11186.
[50] G. Kresse, *Phys. Rev. B* 1999, 59, 1758-1775.
[51] J. P. Perdew, K. Burke, M. Ernzerhof, *Phys. Rev. Lett.* 1996, 77, 3865-3868.
[52] C. Freysoldt, J. Neugebauer, C. G. Van De Walle, *Phys. Rev. Lett.* 2009, 102, 1-4.
[53] C. Freysoldt, J. Neugebauer, C. G. Van de Walle, *Phys. Status Solidi Basic Res.* 2011, 248, 1067-1076.

Further Experimental Section

Chemicals

All chemicals were used without purification. Aluminum acetylacetonate (Sigma Aldrich, 99%), Copper (I) Iodide (Aldrich, 98%), 1-dodecanethiol (Alfa Aesar, 98%), Zinc Nitrate Hexahydrate (Alfa Aesar, 98%), Ammonium Hydroxide (Sigma Aldrich)

Synthesis of Zinc Thiolate

Zinc thiolate was prepared by dissolving 50 mmol Zinc Nitrate Hexahydrate in 250 mL methanol before slowly adding a stock thiolate solution (125 mmol 1-dodecanethiol, 150 mmol ammonium hydroxide, 200 mL methanol) and stirring for 15 minutes. The precipitate was then filtered and washed with 30 mL hexanes three times and dried overnight in a vacuum dessciator (79% yield).

Characterization

UV-Vis: All spectra were gathered using a Cary 5000 UV-Vis-NIR spectrophotometer.

Fluorescence: All spectra were gathered using a Fluoromax-3 fluorimeter.

NMR: All spectra were gathered using an Avance 400 NMR spectrometer. All samples were dissolved in deuterated pyridine.

XRD: All data was gathered with a Rigaku SmartLab.

TEM/EDX: All images were gathered by Jules Gardener at Harvard CNS using a JEOL ARM 200F STEM.

2D Excitation Spectroscopy: All spectra were gathered using a Fluoromax-3 fluorimeter by performing standard excitation spectroscopy using a 1 nm slit width for both excitation and emission slits, performed with 5 nm increments of the monitored wavelength on samples with <0.2 OD at all measured wavelengths.

Quantum Yield: Quantum yield was estimated by measuring fluorescence and absorbance of samples and a dye reference, 9,10-diphenylanthracene (QY 90%)[1] using 350 nm excitation and measuring Fluorescence and UV-Vis with the above instruments (all with <0.2 OD at relevant wavelengths) and utilizing the following calculation:

$$QY_{sample} = \frac{\text{Total Integrated Counts}_{sample} / \text{Absorbance at Excitation Wavelength}_{sample}}{\text{Total Integrated Counts}_{standard} / \text{Absorbance at Excitation Wavelength}_{standard}} * QY_{standard}$$

Nanocrystal samples in solution were excited with a 405 nm or 375 nm picosecond pulsed diode laser (Picoquant P-C-405, Picoquant P-C-375) tuned to a repetition rate of 10 mHz using a pulse generator (Stanford Research; DG535). The excitation power was set between 5 nW and 10 nW to maintain <5% of the maxiSmum count rate to avoid overrun artifacts. The photons emitted from the nanocrystals were collected and collimated using an off-axis parabolic mirror (Thorlabs MPD269V) and sent into a silicon single-photon avalanche photodiode (SPAD) detector (Micro Photon Devices SPD-100-C0C). Scattered pump photons were suppressed using a 405 nm notch filter (Thorlabs NF405-13) and a high performance 425 nm longpass filter (Edmund Optics #84-742) for 405 nm excitation measurements. Scattered pump photons were suppressed using a 380 nm blocking edge BrightLine® longpass filter (Semrock; FF01-380/LP-25) for 375 nm excitation measurements. The photon arrival times were recorded using a time-correlated single photon counting card (Picoquant PicoHarp 300). All of the data processing, histogramming, and analysis was performed in Matlab with custom scripts.

Temperature-Dependent Photoluminescence Lifetimes: The low-temperature photoluminescence emission spectra were determined by drop-casting DNCs from toluene onto a quartz substrate (MTI) and drying overnight. The sample was transferred into a closed-cycle liquid helium cryostat (Montana Instruments) with an agile temperature sample mount (ATSM) for fast change of the sample temperature. The DNC film was excited with a pulsed 405 nm diode laser (Picoquant LDH-D-C-405) in a home-built confocal microscope and the emission was directed to a monochromator (Princeton Instruments Acton 2500) and detected with a cooled EMCCD camera (Princeton Instruments ProEM512). For the lifetime measurements, the emission was detector to an Avalance Photodiode (Excelitas) and detected in time-correlated single photon counting mode using standard single photon counting equipment (Picoquant Hydraharp, T3 mode). All analysis was performed with custom MATLAB software.

DFT Calculations

All DFT calculations were performed using the Vienna Ab Initio Simulation Package (VASP, v5.4.4) (refs. 2, 3). Electronic wavefunctions were expanded in a plane-wave basis with a kinetic energy cutoff of 400 eV and the core-valence interaction was treated by the projector-augmented wave (PAW) method (ref 4).

Defects Calculations

Defects were created within a 2×2×1 supercell and the Brillouin zone was sampled using a Γ-centered 3×3×3 k-mesh. The atomic positions were relaxed until the residual forces were less than 0.01 eV/Å, using the Perdew-Burke-Ernzerhof (PBE) generalized gradient approximation to the exchange correlation functional (ref. 5).

The formation energy of a defect X in charge state q is defined as (ref. 6)

$$E^f[X^q] = E_{tot}[X^q] - E_{tot}[\text{bulk}] - \sum_i n_i\mu_i + qE_F + E_{corr}. \quad (1)$$

$E_{tot}[X^q]$ is the total energy of the supercell containing the defect $X^q$, and $E_{tot}[\text{bulk}]$ is the total energy of the equivalent pristine supercell. The integer $n_i$ indicates the number of atoms i that have been added to ($n_i>0$) or removed from ($n_i<0$) the supercell to form the defect, and the $\mu_i$ are the corresponding chemical potentials of the species. $E_F$ is the electron Fermi energy, and $E_{corr}$ is a non-trivial correction term that accounts for the electrostatic/Coulomb interactions between charged defects in a periodic boundary condition.

For charged defects, $E_{corr}$ include a constant electrostatic potential alignment offset, and as well as corrections due to the inclusion of a uniform background jellium to neutralize the cell (refs. 6, 8). The scheme proposed by Freysoldt et. al. as implemented in the SXDEFECTALIGN code (refs. 9, 10) was used to evaluate $E_{corr}$. For CuAlS$_2$, the experimental dielectric constant of $\epsilon=7.0$ is used (ref. 11), and $\epsilon_{xx}$, $\epsilon_{yy}$ 5.52, and $\epsilon_{zz}$ 5.69 was calculated for CuAl$_5$S$_8$ at the PBE level. Due to the small anisotropy in the system, a simple isotropic dielectric constant of 5.6 was assumed.

The thermodynamic defect transition energy between charge states $q_1$ and $q_2$ is defined as $$\varepsilon(q_1/q_2) = \frac{E^f(X^{q_1}; E_F=0) - E^f(X^{q_2}; E_F=0)}{q_1 - q_2} \quad (2)$$

where $E^f$ is defined in Equation (1).

Thermodynamics Calculations

At equilibrium, the Gibbs free energy of formation for CuAl$_5$S$_8$ with respect to its elemental species is given by $$\Delta G_{CuAl_5S_8} = \Delta\mu_{Cu} + 5\Delta\mu_{Al} + 8\Delta\mu_S \quad (3)$$

$\Delta\mu_i = \mu_i - \mu_i^0$ is the difference between the absolute chemical potential of species i and those at the standard reference state. The allowed values of $\mu_i$ are bound to preserve the stability of CuAl$_5$S$_8$ to avoid precipitation of the elemental solid and other competing phases. These constrains are summarized by the following inequalities $$\Delta\mu_i \leq 0 \, \forall i$$

$$2\Delta\mu_{Cu} + \Delta\mu_S \leq \Delta G_{Cu_2S}$$

$$2\Delta\mu_{Cu} + \Delta\mu_{Al} + 2\Delta\mu_S \leq \Delta G_{CuAlS_2}$$

$$2\Delta\mu_{Al} + 3\Delta\mu_S \leq \Delta G_{Al_2S_3}$$

The Gibbs free energy of the compounds can be approximated by their total DFT energies by ignoring the small contributions from Helmholtz vibrational energy and pressure volume term[12]. Equation (3) can then be rewritten as $$\Delta G_{CuAl_5S_8} = E_{CuAl_5S_8}^{DFT} - E_{Cu}^{DFT} - 5_{Al}^{DFT} - 8_S^{DFT}$$

where $E^{DFT}$ is the DFT total energy of the respective material in their solid standard state. As the PBE0 approximation does not provide accurate energies for metals, $E_{Cu}^{DFT}$ and $E_{Al}^{DFT}$ are calculated using the experimental standard formation enthalpies, $\Delta H^0$ of Al$_2$S$_3$ and Cu$_2$S (ref 13).

$$E_{Al}^{DFT} = \frac{1}{2}(E_{Al_2S_3}^{DFT} - E_S^{DFT} - \Delta H_{Al_2S_3}^0)$$

$$E_{Cu}^{DFT} = \frac{1}{2}(E_{Cu_2S}^{DFT} - E_S^{DFT} - \Delta H_{Cu_2S}^0)$$

References in additional experimental section, each of which is incorporated by reference in its entirety.

(1) Meech, S. R.; Phillips, D. Photophysics of Some Common Fluorescence Standard. *J. Photochem.* 1983, 23, 193-217.

(2) Kresse, G.; Furthmüller, J. Efficiency of Ab-Initio Total Energy Calculations for Metals and Semiconductors Using a Plane-Wave Basis Set. *Comput. Mater. Sci.* 1996, 6, 15-50.

(3) Kresse, G.; Furthmüller, J. Efficient Iterative Schemes for Ab Initio Total-Energy Calculations Using a Plane-Wave Basis Set. *Phys. Rev. B* 1996, 54, 11169-11186.

(4) Kresse, G. From Ultrasoft Pseudopotentials to the Projector Augmented-Wave Method. *Phys. Rev. B* 1999, 59, 1758-1775.

(5) Perdew, J. P.; Burke, K.; Ernzerhof, M. Generalized Gradient Approximation Made Simple. *Phys. Rev. Lett.* 1996, 77, 3865-3868.

(6) Freysoldt, C.; Grabowski, B.; Hickel, T.; Neugebauer, J.; Kresse, G.; Janotti, A.; Van De Walle, C. G. First-Principles Calculations for Point Defects in Solids. *Rev. Mod. Phys.* 2014, 86 (1), 253-305.

(7) Perdew, J. P.; Ernzerhof, M.; Burke, K. Rationale for Mixing Exact Exchange with Density Functional Approximations. *J. Chem. Phys.* 1996, 105 (22), 9982-9985.

(8) Makov, G.; Payne, M. Periodic Boundary Conditions in Ab Initio Calculations. *Phys. Rev. B* 1995, 51 (7), 4014-4022.

(9) Freysoldt, C.; Neugebauer, J.; Van De Walle, C. G. Fully Ab Initio Finite-Size Corrections for Charged-Defect Supercell Calculations. *Phys. Rev. Lett.* 2009, 102 (1), 1-4.

(10) Freysoldt, C.; Neugebauer, J.; Van de Walle, C. G. Electrostatic Interactions between Charged Defects in Supercells. *Phys. Status Solidi Basic Res.* 2011, 248 (5), 1067-1076.

(11) Shigefua, C.; Shirakata, S.; Isomura, S.; Nakanishi, H. Visible and Ultraviolet Photoluminescence from Cu-III-VI 2 Chalcopyrite Semiconductors Grown by Metalorganic Vapor Phase Epitaxy. *Jpn. J Appl. Phys. Part 1* 1997, 36, 1703-1714.

(12) Liborio, L. M.; Bailey, C. L.; Mallia, G.; Tomić, S.; Harrison, N. M. Chemistry of Defect Induced Photoluminescence in Chalcopyrites: The Case of CuAlS2. *J. Appl. Phys.* 2011, 109 (2), 1-9.

(13) Cox, J. D.; Wagman, D. D.; Medvedev, V. A. *CODATA Key Values for Thermodynamics*; Hemisphere Publishing Corp., 1989.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features and basic principles of the invention.

What is claimed is:

1. A plurality of nanocrystals having the formula:

$Cu\text{—}Al\text{—}X_2$, where X is S or Se, wherein the nanocrystals have a luminescence quantum yield of at least 10%.

2. The plurality of nanocrystals of claim 1, further comprising a zinc sulfide over coating.

3. The plurality of nanocrystals of claim 1, wherein the nanocrystals are doped with zinc.

4. The plurality of nanocrystals of claim 1, wherein the nanocrystals have an emission of between 380 and 560 nm.

5. The plurality of nanocrystals of claim 1, wherein the nanocrystals have an emission of between 420 and 550 nm.

6. The plurality of nanocrystals of claim 1, wherein the nanocrystals have an emission efficiency of at least 10%.

7. The plurality of nanocrystals of claim 1, wherein the nanocrystals have a size of between 2 nm and 20 nm.

8. The plurality of nanocrystals of claim 1, wherein the nanocrystals have a size of between 3 nm and 10 nm.

9. The plurality of nanocrystals of claim 1, wherein the nanocrystals are $CuAlS_2$ nanocrystals.

10. A method of making semiconductor nanocrystals comprising:
    heating a first mixture including:
       a first M donor including Cu; and
       a second M donor including Al; and
    adding a first E donor including a sulfur or selenium to the first mixture, thereby forming a population of nanocrystal cores having the formula:

$Cu\text{—}Al\text{—}X_2$, where X is S or Se, the semiconductor nanocrystals having a luminescence quantum yield of at least 10%.

11. The method of claim 10, wherein the nanocrystals are defective nanocrystals.

12. The method of claim 10, wherein:
    the nanocrystals comprise $CuAlS_2$, and
    further comprising adding ZnS to the first mixture after the adding of the first E donor such that the nanocrystals are alloyed with ZnS.

13. A semiconductor nanocrystal comprising a core including a IB-IIIA-VIA semiconductor material, wherein:
    the nanocrystal has a luminescence quantum yield of at least 10%,
    the nanocrystal has a peak luminescence emission wavelength in the range of 380 nm to 560 nm,
    the nanocrystal is a defective nanocrystal,
    the group IB element is copper,
    the group IIIA element is aluminum, and
    the group VIA element is sulfur or selenium.

14. The semiconductor nanocrystal of claim 13, wherein the nanocrystal is doped with zinc.

15. The semiconductor nanocrystal of claim 13, wherein the nanocrystal includes a zinc sulfide shell over the core.

16. The semiconductor nanocrystal of claim 13, wherein the IB-IIIA-VIA semiconductor material is $CuAlS_2$ or $CuAl_5S_8$.

* * * * *

UNITED STATES PATENT AND TRADEMARK OFFICE
CERTIFICATE OF CORRECTION

PATENT NO. : 12,441,939 B2
APPLICATION NO. : 17/086285
DATED : October 14, 2025
INVENTOR(S) : Moungi Bawendi et al.

Page 1 of 1

It is certified that error appears in the above-identified patent and that said Letters Patent is hereby corrected as shown below:

In the Specification

At Column 1, Lines 14-17:
"This invention was made with Government support under Grant No. DE-FG02-07ER46454 awarded by the Department of Energy. The Government has certain rights in the invention."

Should read:
--This invention was made with government support under DE-FG02-07ER46454 awarded by the U.S. Department of Energy. The government has certain rights in the invention.--

Signed and Sealed this
Ninth Day of December, 2025

John A. Squires
*Director of the United States Patent and Trademark Office*